United States Patent
Son et al.

(10) Patent No.: US 10,491,153 B2
(45) Date of Patent: Nov. 26, 2019

(54) CONTROL DEVICE OF HOME ENERGY MANAGEMENT SYSTEM FOR POWER CONSUMPTION

(71) Applicant: LG Electronics Inc., Seoul (KR)

(72) Inventors: Dongmin Son, Seoul (KR); Jiyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 15/669,533

(22) Filed: Aug. 4, 2017

(65) Prior Publication Data

US 2018/0041044 A1 Feb. 8, 2018

(30) Foreign Application Priority Data

Aug. 5, 2016 (KR) .................. 10-2016-0099830
Aug. 5, 2016 (KR) .................. 10-2016-0099831
Aug. 5, 2016 (KR) .................. 10-2016-0099832

(51) Int. Cl.
*H02S 10/10* (2014.01)
*G06Q 50/06* (2012.01)
(Continued)

(52) U.S. Cl.
CPC .............. *H02S 10/10* (2014.12); *G05B 15/02* (2013.01); *G06Q 10/0631* (2013.01);
(Continued)

(58) Field of Classification Search
CPC .... H02S 10/10; G05B 15/02; G06Q 10/0631; G06Q 50/06; H02J 3/14; H02J 3/383; H02J 3/46; H04L 12/2807; H04L 12/2816
See application file for complete search history.

(56) References Cited

U.S. PATENT DOCUMENTS 9,257,842 B2 2/2016 Xia et al.
2009/0295227 A1* 12/2009 Chang .................. H02J 3/32
307/46
(Continued)

FOREIGN PATENT DOCUMENTS

EP 2701261 A1 2/2014

OTHER PUBLICATIONS

Ogwumike et al. "Evaluation of a Heuristic Approach for Efficient Scheduling of Residential Smart Home Appliances", 2015 IEEE 15th International Conference on Environment and Electrical Engineering (EEEIC), pp. 2017-2022 (2015) (Year: 2015).*

*Primary Examiner* — Thomas C Lee
*Assistant Examiner* — Michael Tang
(74) *Attorney, Agent, or Firm* — Birch, Stewart, Kolasch & Birch, LLP

(57) ABSTRACT

Provided is a control device of a home energy management system (HEMS). The control device includes a communication unit configured to connect to a HEMS gateway and a terminal, a storage unit configured to store information on a power consumption per hour of each of home appliances connected to the HEMS gateway, and a control unit configured to receive usage information including a power usage amount of each of the home appliances and power generation information including a power generation amount of a photovoltaic (PV) module, match the power usage amount of each of the home appliances with the power generation amount of the PV module on the basis of the received usage information and power generation information, and generate usage information of PV power for each home appliance on the basis of the matching result.

14 Claims, 16 Drawing Sheets

(51) Int. Cl.
  *H02J 3/14* (2006.01)
  *H04L 12/28* (2006.01)
  *G05B 15/02* (2006.01)
  *H02J 3/38* (2006.01)
  *H02J 3/46* (2006.01)
  *G06Q 10/06* (2012.01)

(52) U.S. Cl.
  CPC ............. *G06Q 50/06* (2013.01); *H02J 3/14* (2013.01); *H02J 3/383* (2013.01); *H02J 3/46* (2013.01); *H04L 12/2807* (2013.01); *H04L 12/2816* (2013.01); *G05B 2219/2642* (2013.01); *H02J 2003/143* (2013.01); *Y02B 10/14* (2013.01)

(56) References Cited

U.S. PATENT DOCUMENTS

| | | | |
|---|---|---|---|
| 2010/0174643 A1* | 7/2010 | Schaefer | G06Q 20/102 705/40 |
| 2010/0293045 A1* | 11/2010 | Burns | G06Q 30/0208 705/14.11 |
| 2010/0312430 A1 | 12/2010 | Troncoso et al. | |
| 2011/0145611 A1 | 6/2011 | Lee | |
| 2011/0295915 A1* | 12/2011 | Ejiri | G06F 17/30132 707/821 |
| 2012/0053739 A1 | 3/2012 | Brian et al. | |
| 2012/0286052 A1* | 11/2012 | Atluri | B60K 16/00 237/28 |
| 2012/0310416 A1* | 12/2012 | Tepper | G05B 15/00 700/276 |
| 2013/0006831 A1* | 1/2013 | Mise | G06Q 10/06 705/37 |
| 2013/0144451 A1* | 6/2013 | Kumar | G05B 13/02 700/291 |
| 2014/0042811 A1* | 2/2014 | Myamoto | H02J 3/383 307/31 |
| 2014/0316599 A1* | 10/2014 | Tomita | H04L 12/2823 700/295 |
| 2015/0319056 A1* | 11/2015 | Inoue | G06Q 30/04 709/224 |
| 2016/0016484 A1 | 1/2016 | Igarashi et al. | |
| 2016/0307413 A1* | 10/2016 | Rafii | G08B 3/10 |
| 2017/0059633 A1* | 3/2017 | Shon | G01R 21/133 |

* cited by examiner

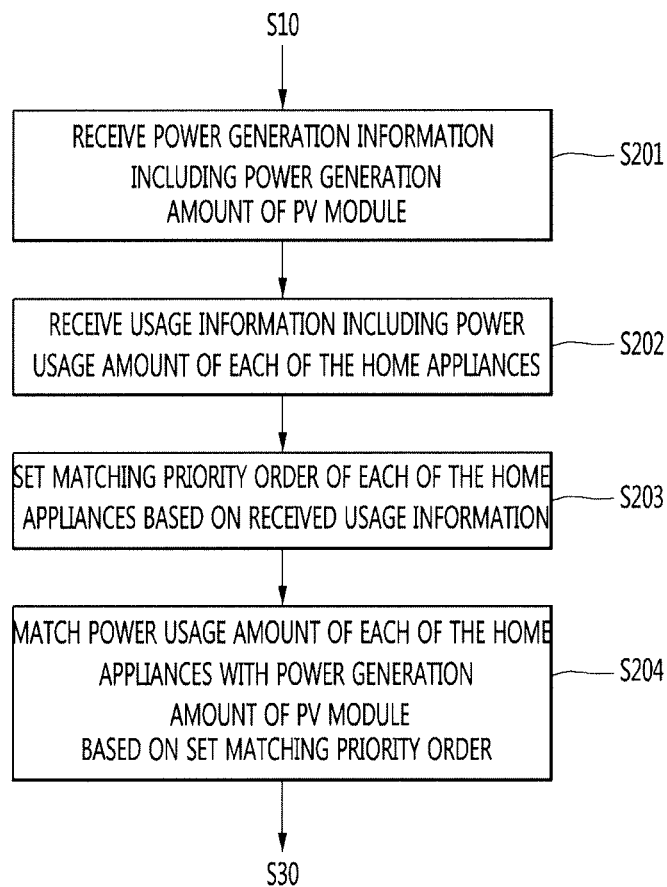

FIG. 11

TABLE 4

| TIME | WASHING MACHINE | AIR CONDITIONER | OVEN | REFRIGERATOR |
|---|---|---|---|---|
| 08:00 ~ 09:00 | 700Wh | 0 | 500Wh | 150Wh |
| 09:00 ~ 11:00 | 700Wh | 2kWh | 0 | 300Wh |
| 11:00 ~ 15:00 | 0 | 7.5kWh | 250Wh | 600Wh |
| 15:00 ~ 17:00 | 0 | 3kWh | 0 | 300Wh |
| 17:00 ~ 19:00 | 0 | 0 | 500Wh | 300Wh |

FIG. 12

PV POWER USAGE AMOUNT FOR EACH TIME

TABLE 5

| TIME | WASHING MACHINE | AIR CONDITIONER | OVEN | REFRIGERATOR |
|---|---|---|---|---|
| 08:00 ~ 09:00 | 300Wh | 0 | 500Wh | 0 |
| 09:00 ~ 11:00 | 500Wh | 2kWh | 0 | 0 |
| 11:00 ~ 15:00 | 0 | 7.5kWh | 250Wh | 250Wh |
| 15:00 ~ 17:00 | 0 | 3kWh | 0 | 0 |
| 17:00 ~ 19:00 | 0 | 0 | 500Wh | 0 |

FIG. 13
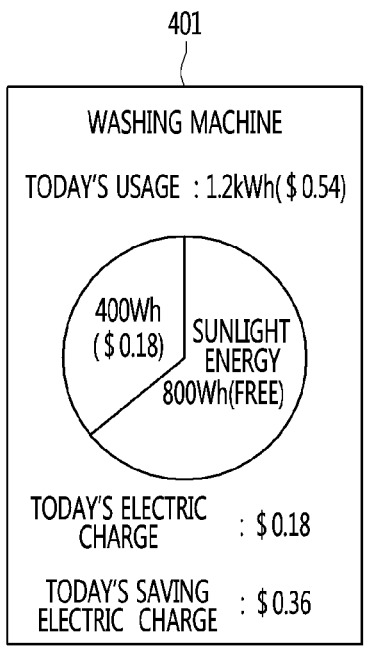
FIG. 14
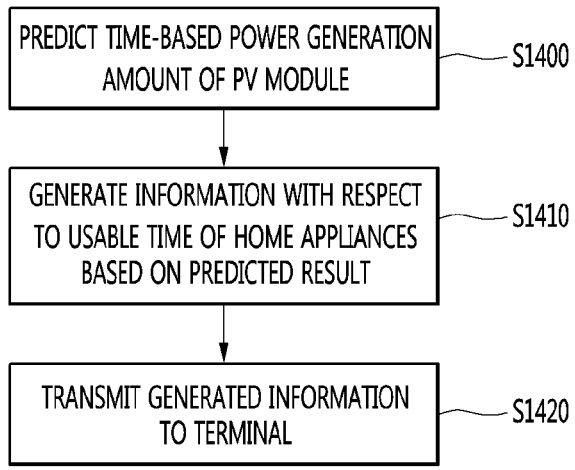
FIG. 15
TABLE 6
| TIME | POWER GENERATION AMOUNT |
|---|---|
| 08:00 ~ 09:00 | 1 kWh |
| 09:00 ~ 11:00 | 2 kWh |
| 11:00 ~ 15:00 | 2.5 kWh |
| 15:00 ~ 17:00 | 1.5 kWh |
| 17:00 ~ 19:00 | 0.5 kWh |
FIG. 16
TABLE 7
| TIME | WASHING MACHINE (700Wh) | AIR CONDITIONER (2kWh) |
|---|---|---|
| 08:00 ~ 09:00 | O | X |
| 09:00 ~ 11:00 | O | O |
| 11:00 ~ 15:00 | O | O |
| 15:00 ~ 17:00 | O | X |
| 17:00 ~ 19:00 | X | X |

TABLE 8

| TIME | AIR CONDITIONER (2kWh) | WASHING MACHINE (700Wh) | REFRIGERATOR (150Wh) | DISHWASHER (500Wh) |
|---|---|---|---|---|
| 08:00 ~ 11:00 | 4 | 3 | 1 | 2 |
| 11:00 ~ 15:00 | 2 | 3 | 1 | 4 |
| 15:00 ~ 17:00 | 3 | 2 | 1 | 4 |
| 17:00 ~ 19:00 | 4 | 3 | 1 | 2 |

FIG. 19

TABLE 9

| TIME | OPERABLE DEVICE |
|---|---|
| 08:00 ~ 09:00 | REFRIGERATOR, DISHWASER |
| 09:00 ~ 11:00 | REFRIGERATOR, DISHWASHER, WASHING MACHINE |
| 11:00 ~ 15:00 | REFRIGERATOR, AIR CONDITIONER |
| 15:00 ~ 17:00 | REFRIGERATOR, WASHING MACHINE, DISHWASHER |
| 17:00 ~ 19:00 | REFRIGERATOR |

FIG. 20

TABLE 10

| TIME | OPERABLE DEVICE |
|---|---|
| 08:00 ~ 09:00 | REFRIGERATOR, DISHWASER |
| 09:00 ~ 11:00 | REFRIGERATOR, DISHWASHER, WASHING MACHINE |
| 11:00 ~ 15:00 | REFRIGERATOR, AIR CONDITIONER |
| 15:00 ~ 17:00 | REFRIGERATOR, WASHING MACHINE, DISHWASHER |
| 17:00 ~ 19:00 | REFRIGERATOR, DISHWASHER |

FIG. 21A

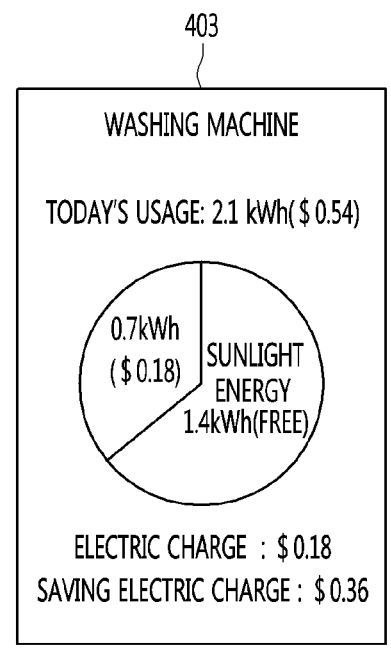

FIG. 21B
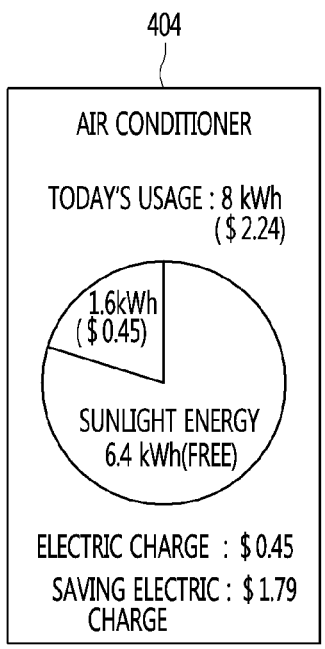
FIG. 22
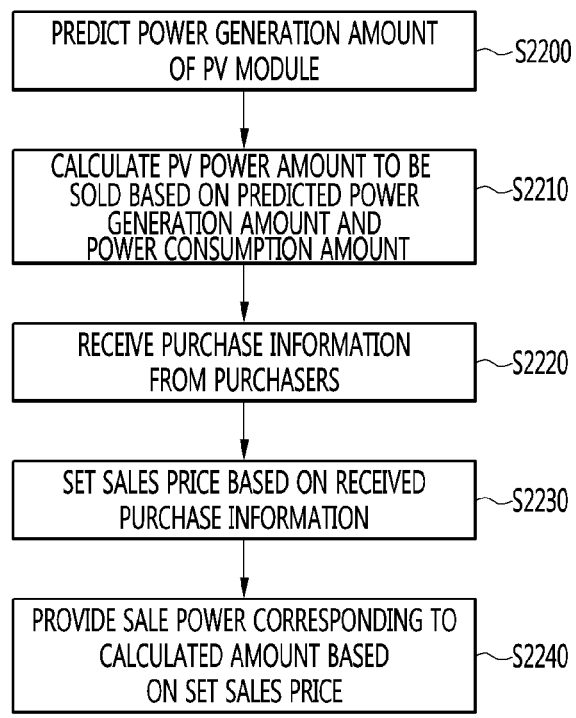
FIG. 23
TABLE 11
| TIME | PREDICTED POWER GENERATION AMOUNT |
|---|---|
| 08:00 ~ 10:00 | 1kWh |
| 10:00 ~ 12:00 | 3kWh |
| 12:00 ~ 14:00 | 6kWh |
| 14:00 ~ 16:00 | 5kWh |
| 16:00 ~ 18:00 | 3kWh |

TABLE 12

| TIME | POWER CONSUMPTION AMOUNT | PV POWER AMOUNT TO BE SOLD |
|---|---|---|
| 08:00 ~ 10:00 | 1kWh | 0 |
| 10:00 ~ 12:00 | 1kWh | 2kWh |
| 12:00 ~ 14:00 | 2kWh | 4kWh |
| 14:00 ~ 16:00 | 3kWh | 2kWh |
| 16:00 ~ 18:00 | 3kWh | 0 |

CONTROL DEVICE OF HOME ENERGY MANAGEMENT SYSTEM FOR POWER CONSUMPTION

CROSS-REFERENCE TO RELATED APPLICATIONS

The present application claims the benefit of priority in Korean Patent Application Nos. 10-2016-0099830, 10-2016-0099831, and 10-2016-0099832, filed on Aug. 5, 2016, which are hereby incorporated by reference in their entireties under 35 U.S.C. § 119.

BACKGROUND

The present disclosure relates to a control device of a home energy management system.

Home energy management systems represent systems for efficiently managing the use of electric power in household appliances. Such a home energy management system may be connected to various power supply devices or power consumption devices in the home to monitor the power supply status and power consumption status and thereby to control an operation of each of the devices according to the monitored results.

In recent years, the spread of a photovoltaic (PV) module has been expanding. Since power supplied from the PV module is effective in terms of reduction of the electric bill because no separate electric charge is generated. In addition, revenue may be generated by selling at least a portion of the power supplied from the PV module to another person or the power facility.

However, in case of the current home energy management system, usage information of the power supplied from the PV module is not intuitively provided to the user. Thus, the user may not clearly appreciate the benefit of using the power generated from the PV module and may not be provided the maximum benefit according to the sensation result.

Also, in case of the home energy management system, a storage device for surplus power of the power supplied from the PV module is not provided, or battery capacity of the storage device is not sufficient even though the storage device is provided. Thus, the surplus power may be directly emitted to the system or resold at a low price. As a result, it is necessary to efficiently utilize the power supplied from the PV module by minimizing the generation of the surplus power.

In addition, since the spread of the PV module is expanding, the trading of the PV power may also become more active in the future. Accordingly, there is a need for a scheme that is capable of facilitating the user's convenience by more conveniently trading the PV power or by automatically trading the PV power.

SUMMARY

Embodiments provide a control device of a home energy management system, which more intuitively provides information of a PV power used by home appliances to allow a user to conveniently confirm a use state of power generated by a PV module.

Embodiments also provide a control device of a home energy management system, which more intuitively provides information of a PV power used by home appliances to allow a user to experience benefit of using power generated by the PV module.

Embodiments also provide a control device of a home energy management system, which matches a power generation amount of a PV module according to characteristics of home appliances to effectively provide benefit of using power generated by the PV module.

In one embodiment, a control device of a home energy management system matches power consumption of each of the home appliances with a power generation amount of a PV module and generates usage information of a PV power for each of the home appliances on the basis of the matching result.

The home energy management system may transmit power consumption information for each of the home appliances, which includes the usage information of a PV power for each of the home appliances, to a terminal.

In another embodiment, power consumption information for each of the home appliances includes generated electricity charge information to allow a user to experience benefit of using power generated by a PV module.

In yet another embodiment, a control device of a home energy management system sets a matching priority order of each of home appliances on the basis of at least one of a power consumption amount of each of the home appliances and a consumption amount per hour for each of the home appliances. The power usage amount of each of the home appliances and the generation amount of the PV module may match each other based on the set matching priority order.

The details of one or more embodiments are set forth in the accompanying drawings and the description below. Other features will be apparent from the description and drawings, and from the claims.

BRIEF DESCRIPTION OF THE DRAWINGS

FIG. 6 is a flowchart illustrating an example of an operation of matching a power usage amount of each of the home appliances with a power generation amount of the PV module through the control device.

FIG. 7 is a view illustrating an example indicating a power generation amount of the PV module and the power usage amount of each of the home appliances in the home energy management system according to an embodiment.

FIG. 8 is a view illustrating an example of results obtained by matching the power usage amount of each of the home appliances and the power generation amount of the PV module through the control device on the basis of the example of FIG. 7.

FIG. 11 is a view illustrating an example of the time-based power usage amount of each of the home appliances.

FIG. 12 is a view illustrating an example of results obtained by matching the time-based power usage amount of each of the home appliances and the time-based power generation amount of the PV module through the control device on the basis of the example of FIGS. 10 and 11.

FIG. 13 is a view illustrating an example of power consumption information of the home appliances, which is supplied to a terminal by the control device, on the basis of the matching result.

FIG. 14 is a flowchart illustrating an operation method of the control device according to an embodiment.

FIG. 15 is a table showing predicted results of the time-based power generation amount when the control device predicts the time-based power generation amount of the PV module according to an embodiment.

FIG. 16 is a table showing information on a usable time of each of the home appliances, which is generated by the control device on the basis of the predicted results of the time-based power generation amount of FIG. 15.

FIG. 19 is a view illustrating an example of an operation schedule of each of the home appliances, which is generated by the control device on the basis of the embodiments of FIGS. 15 and 18, according to an embodiment.

FIG. 20 is a view illustrating an example of an operation schedule that is changed by the control device when the power generation amount of the PV module and the predicted power generation amount are different from each other.

FIGS. 21A and 21B are views illustrating examples of power usage information for each various home appliances, each of which is provided to a terminal by the control device, respectively.

FIG. 22 is a flowchart illustrating an operation method of the control device according to an embodiment.

FIG. 23 is a table showing predicted results of a time-based power generation amount when the control device predicts the time-based power generation amount of the PV module according to an embodiment.

DETAILED DESCRIPTION OF THE EMBODIMENTS

Hereinafter, embodiments of the present disclosure will be described in more detail with reference to the accompanying drawings. In the following description, used terms, such as a "module" and a "unit", are used for convenience of description, and they do not have different meanings or functions in and of themselves.

Figure 1:
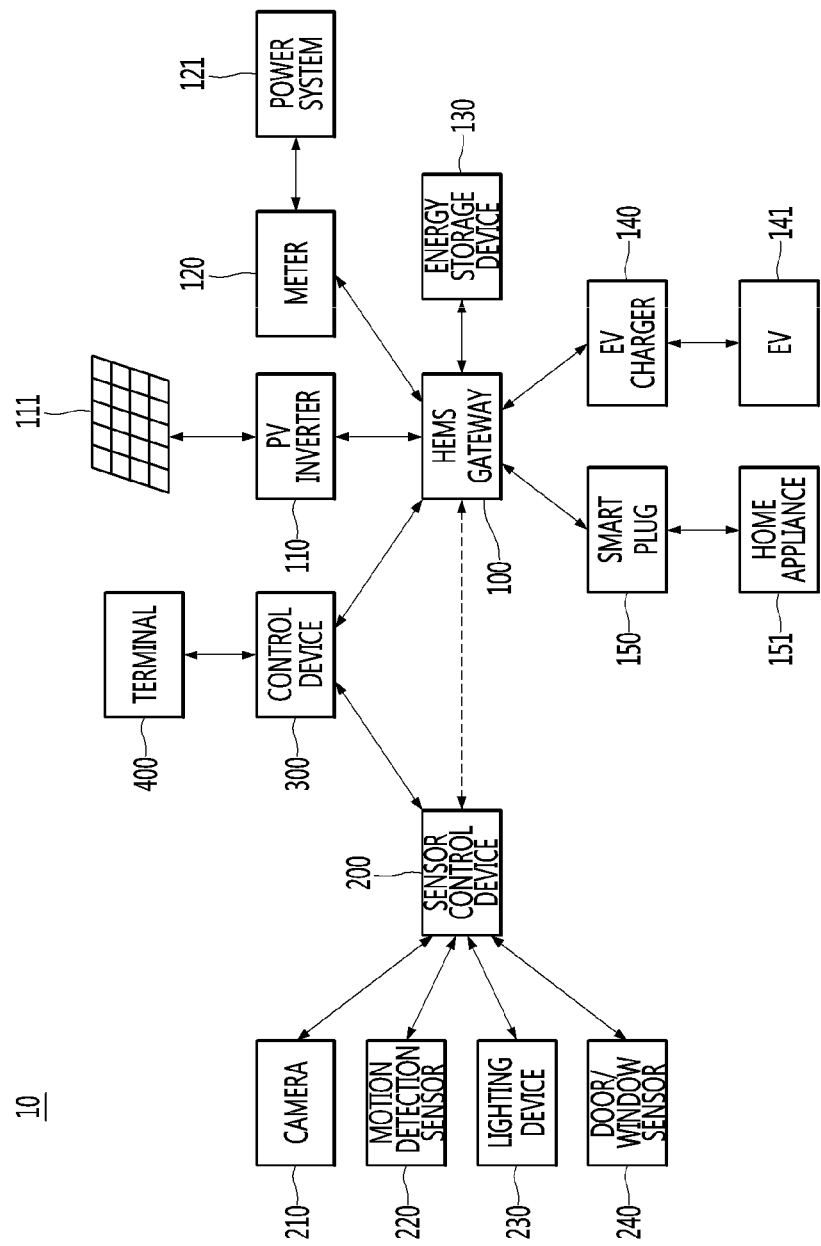
FIG. 1 is a schematic block diagram of a home energy management system according to an embodiment.

FIG. 1 is a schematic block diagram of a home energy management system according to an embodiment.

Referring to FIG. 1, a home energy management system (HEMS) 10 may be mainly implemented in the home and manage energy (power) supply, consumption, storage, and the like in the home. The HEMS 10 may include an HEMS gateway 100, a sensor control device 200, and a control device 300.

The HEMS gateway 100 may receive sensing information acquired from the sensor control device 200. The HEMS gateway 100 may transmit the received sensing information to the control device 300. The HEMS gateway 100 may exchange information with the sensor control device 200 through a short-range wireless communication module. The short-range wireless communication module may be one of BLUETOOTH®, Wi-Fi, and ZigBee®, but these are merely examples of short-range wireless communication modules useable with the HEMS gateway 100 and are not intended to be exhaustive of all short-range wireless communication modules.

The HEMS gateway 100 may receive information on power from power management-related devices that are installed in the home. The HEMS gateway 100 may transmit information on the received power to the control device 300. The HEMS gateway 100 and the control device 300 may be connected to the each other through the internet, but this is merely an example.

The HEMS gateway 100 may be connected to devices associated with power supply, power consumption, and power storage, which are installed or provided in the home to control operations of the connected devices. As illustrated in FIG. 1, the HEMS gateway 100 may be connected to at least one of a photovoltaic (PV) inverter 110, meter (or a smart meter) 120, an energy storage device (or an energy storage system (ESS)) 130, an electric vehicle (EV) charger 140, and a smart plug 150. However, the kinds of devices connected to the HEMS gateway 100 may be variously changed according to an embodiment.

The PV inverter 110 may convert DC power supplied from the PV module 111 into AC power. Particularly, the PV module 111 may generate power by using a photoelectric effect and supply the generated power to the home. Although the power generated by the PV module 111 is DC power, various power consumption devices provided in the home may operate by using AC power. Thus, the PV inverter 110 may convert the DC power into the AC power to supply the converted AC power to the home. Although the HEMS 10 includes the PV inverter 110 and the PV module 111 in this disclosure, the HEMS 10 may be provided with other various types of environmentally friendly power generation modules and inverters corresponding thereto. Examples of the power generation modules and the inverters may include a wind power generation module and an inverter corresponding to the wind power generation module.

The meter 120 may measure a usage amount of power supplied from a power system 121 to the home and consumed in the home. Particularly, the meter 120 according to an embodiment may be implemented as a smart meter. The smart meter may include a communication module for transmitting information on the power usage amount to the HEMS gateway 100.

The ESS 130 may store power supplied from the PV module 111, the power system 121, and/or a battery of an EV 141 or residual power remaining after the consumption of the supplied power. A structure and operation of the ESS 130 will be described below in more detail with reference to FIG. 2.

The EV charger 140 may be connected to the EV 141 to control charging and discharging with respect to the battery provided in the EV 141.

The smart plug 150 may include a power usage amount measurement module measuring a power usage amount of the connected home appliance and a communication module for transmitting the measured power usage amount to the HEMS gateway 100. Also, the power may be supplied or blocked to the connected home appliance according to a control signal received from the HEMS gateway 100.

According to an embodiment, when a separate communication module is provided in the home appliance 151, the HEMS gateway 100 may be connected to the home appliance 151 to control an operation of the home appliance 151.

According to an embodiment, when a separate sensor (for example, a smartThinQ® sensor and the like) for detecting an operation of the home appliance 151 is attached to the home appliance 151, the HEMS gateway 100 may be connected to the corresponding sensor to confirm whether the home appliance 151 is operating.

Although one smart plug 150 and one home appliance 151 connected to the one smart plug 150 are illustrated in FIG. 1, each of the smart plug 150 and the home appliance 151 may be provided in plurality according to an embodiment. In this case, the home appliances may be connected to the different smart plugs from each other.

The sensor control device 200 may be connected to at least one of a camera 210, a motion detection sensor 220, a lighting device 230, and a door/window sensor 240 to receive various information from the connected components. The sensor control device 200 may transmit the various received information to the HEMS gateway 100 or the control device 300. Also, the sensor control device 200 may control an operation of the connected sensor. The type of the sensor connected to the sensor control device 200 is not limited to the types shown, and other various sensors may be connected to the sensor control device 200.

The camera 210 may transmit an image frame such as a still image or a moving image acquired by using an image sensor to the sensor control device 200. The sensor control device 200 may transmit the received image frame to the control device 300. The control device 300 may analyze the received image frame to detect various situations such as a user's presence/absence in the room, an invasion by an outsider, or a fire occurrence on the basis of the analyzed result. The received image frame may be directly analyzed to detect the above-described various situations according to an embodiment.

The motion detection sensor 220 may be mainly implemented as an infrared sensor. The motion detection sensor 220 may detect a change in an infrared ray to transmit a signal corresponding to the detected change to the sensor control device 200. The sensor control device 200 may transmit the received signal to the control device 300, and the control device 300 may detect the user's presence/absence in the room on the basis of the received signal.

The lighting device 230 may be installed in various positions inside and outside the home (e.g., a front door, a kitchen, a living room, a toilet, etc.) to emit light. The sensor control device 200 may control ON/OFF of the lighting device 230, brightness, a color, a flicker of light, or the like.

The door/window sensor 240 may detect an open/close state of a door or a window to determine whether the user is present/absent or may be used to determine whether the outsider has invaded the house.

The control device 300 may be connected to each of the HEMS gateway 100 and the sensor control device 200. For example, the control device 300 may be connected to each of the HEMS gateway 100 and the sensor control device 200 through the Internet. The control device 300 may be provided in the home according to an embodiment. In this case, the control device 300 may be connected to each of the HEMS gateway 100 and the sensor control device 200 by using a LAN cable or the like in a wired manner. Alternatively, the control device 300 may be connected through Wi-Fi in a wireless manner.

The control device 300 may receive various information associated with the devices 110, 120, 130, 140, 141, 150, and 151 from the HEMS gateway 100. Also, the control device 300 may receive various information generated by the sensors 210, 220, 230 and 240 from the sensor control device 200.

The control device 300 may perform overall power management in the home by using the various information received. The control device 300 may determine a power state in the home, the user's presence/absence in the room, and the like by using the various information received from the HEMS gateway 100 or the sensor control device 200. The control device 300 may generate control signals for controlling operations of various devices 110, 120, 130, 140, and 150 connected to the HEMS gateway 100 and the various sensors 210, 220, 230, and 240 connected to the sensor control device 200 to transmit the generated control signals to the HEMS gateway 100 or the sensor control device 200 on the basis of the confirmed results.

That is, a main component for controlling the overall operation of the HEMS 10 according to an embodiment may correspond to the control device 300. The control device 300 may be implemented in the form of a server.

However, according to an embodiment, the HEMS gateway 100 and the sensor control device 200 may be directly connected to each other to exchange various information and the control signals therebetween. In this case, the HEMS gateway 100 may perform all of the function of the HEMS gateway 100 and the function of the control device 300. Thus, the operations of the control device 300, which will be described with reference to the drawings, may be understood as operations performed by the HEMS gateway 100.

Also, the control device 300 may transmit to a terminal 400 the information received from the HEMS gateway 100 or the sensor control device 200 or the information on the power state, the user's presence/absence in the room, and the like, which are confirmed by using the received information.

The terminal 400 may be implemented as a PC, a notebook, a smart phone, a tablet PC, or the like. According to an embodiment, the terminal 400 may be installed in and executed by an application terminal connected to the control device 300 to receive the above-described various information or for controlling the operations of the sensors 210, 220, 230, and 240.

Figure 2:
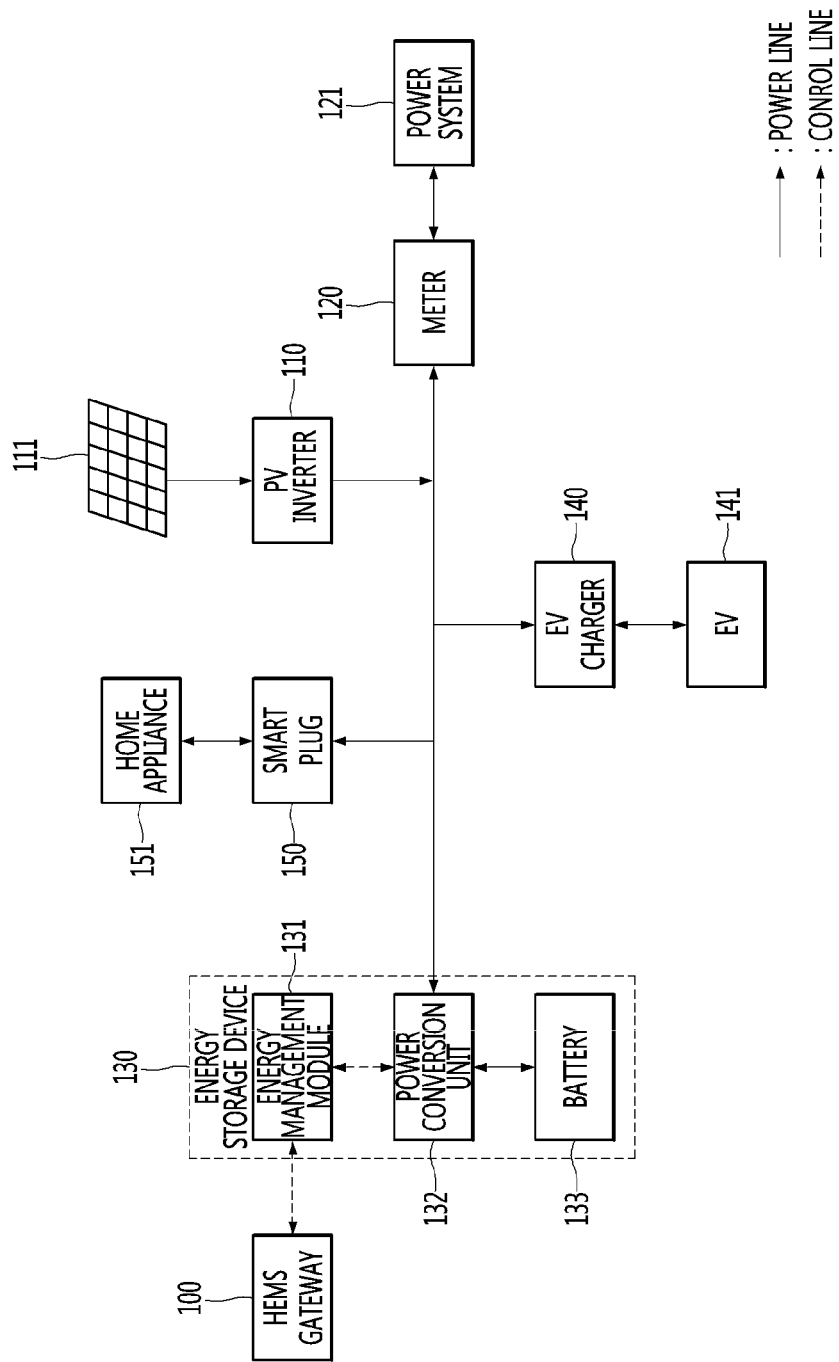
FIG. 2 is a view illustrating a power flow of the home energy management system of FIG. 1.

FIG. 2 is a view illustrating a power flow of the HEMS of FIG. 1.

Before describing a power flow of the HEMS 10, the components of the ESS 130 and an operation of each of the components of the ESS 130 will be described.

The ESS 130 may include an energy management module 131, a power conversion unit 132, and a battery 133.

The energy management module 131 may operate under the control of the HEMS gateway 100 or the control device 300 connected to the HEMS gateway 100. The energy management module 131 may control an overall operation of the ESS 130.

The power conversion unit 132 may include a plurality of inverters and converters. For example, the power conversion unit 132 may convert the power stored in the battery 133 from DC power into AC power to supply the converted AC power to the outside. The power conversion unit 132 may convert the remaining AC power into the DC power. The power conversion unit 132 may include a DC/AC inverter for storing the converted DC power into the battery 133.

Although not shown, the HEMS 10 according to an embodiment may be configured in the form in which the PV module 111 is connected to the power conversion unit 132. Here, the power supplied from the PV module 111 may be converted by the power conversion unit 132, and the converted power may be stored in the battery 133 or supplied to the EV 141 or the home appliance 151. In this case, the power conversion unit 132 may include a DC/DC converter for converting the power supplied from the PV module 111 so that the converted power is stored in the battery 133.

The power conversion operation of the above-described power conversion unit 132 may be controlled by the energy management module 131.

Although not shown, the ESS 130 may include a power management module and a battery management module. The power management module may manage power of the ESS 130 such as the power conversion unit 132 and the battery management module. The battery management module may measure a temperature, current, a voltage, a charged amount, and the like of the battery 133 and monitor states of the battery 133. Also, the battery management module may control the battery 133 so that an operation environment of the battery 133 is optimized based on the monitored states of the battery 133. The energy management module 131 may control operations of the power management module and the battery management module.

Hereinafter, the power flow of the HEMS 10 according to an embodiment will be described.

Referring to FIG. 2, the PV inverter 110 may convert the DC power supplied from the PV module 111 into the AC power. The converted power may be supplied to the EV 141 connected to the EV charger 140 or the home appliance 151 connected to the smart plug 150 and then consumed. According to an embodiment, when remaining power is generated after the consumption, the generated remaining power may be discharged to the power system 121 or sold again or be stored in the battery 133 of the ESS 130.

The meter 120 may measure a power usage amount on the basis of the power supplied from the power system 121. The power supplied from the power system 121 may be consumed by the EV 141 or the home appliance 151 or converted into the form of the DC power by the power conversion unit 132 and then stored in the battery 133.

The EV charger 140 may charge the battery of the EV 141 by using the power generated by the PV module 111, the power supplied from the power system 121, or the power stored in the ESS 130. To charge the battery of the EV 141, the EV charger 140 may convert the AC power into the DC power.

Also, the EV charger 140 may discharge the power charged in the battery of the EV 141. In this case, the EV charger 140 may convert the DC power charged in the battery of the EV 141 into the AC power. The converted power may be supplied to the home appliance 151, stored in the ESS 130, discharged to the power system 121, or sold again.

The smart plug 150 may supply the power generated by the PV module 111, the power supplied from the power system 121, or the power stored in the ESS 130 to the home appliance 151.

As described with reference to FIGS. 1 and 2, since the HEMS gateway 100 is connected to various components 110, 120, 130, 140, and 150 that are provided for each power path within the home, the HEMS gateway 100 may acquire a power flow for each power path or various information associated with the power state. The control device 300 connected to the HEMS gateway 100 may control supply, consumption, and storage operations of power in the home on the basis of the acquired information.

Hereinafter, components of the control device for controlling the overall operation of the HEMS 10 according to an embodiment will be described with reference to FIG. 3.

Figure 3:
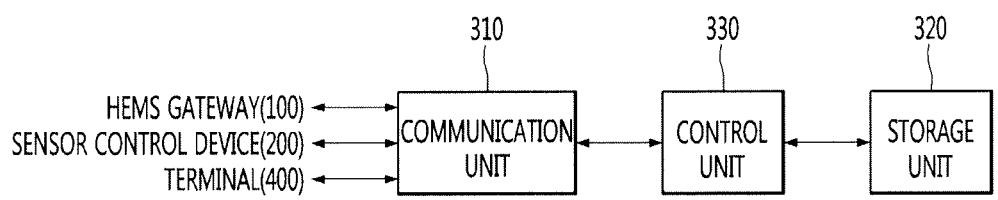
FIG. 3 is a schematic block diagram of a control device for controlling the home energy management system according to an embodiment.

FIG. 3 is a schematic block diagram of a control device for controlling an operation of the HEMS 10 according to an embodiment.

Referring to FIG. 3, the control device 300 may include a communication unit 310, a storage unit 320, and a control unit 330. Since the components provided in the control device 300 are not limited thereto, the control device 300 according to an embodiment may include more components. Also, as discussed above, when the HEMS gateway 100 includes the control device 300, the HEMS gateway 100 may include a communication unit, a storage unit, and a control unit, like the control device 300.

The communication unit 310 may include one or more modules for enabling wired communication or wireless communication between the control device 300 and the HEMS gateway 100, between the control device 300 and the sensor control device 200, and between the control device 300 and the terminal 400.

The control device 300 may receive various information or data associated with the operations between the HEMS gateway 100, the sensor control device 200, and/or terminal 400 and the HEMS 10 to transmit a control signal or command for controlling the HEMS 10.

The storage unit 320 may store the various information or data received through the communication unit 310. Also, the storage unit 320 may store various algorithms, application programs, or other applications for generating control signals or commands that control the operation of the HEMS 10 by using the received information or data.

The control unit 330 may control operations of the various components provided in the control device 300. Also, the control unit 330 may execute the various algorithms, application programs, or other applications stored in the storage unit 320 and process the received information or data to generate a control signal or command for controlling the operation of the HEMS 10.

Hereinafter, an embodiment associated with the operations of the HEMS 10 and the control device 300 will be described.

Figure 4:
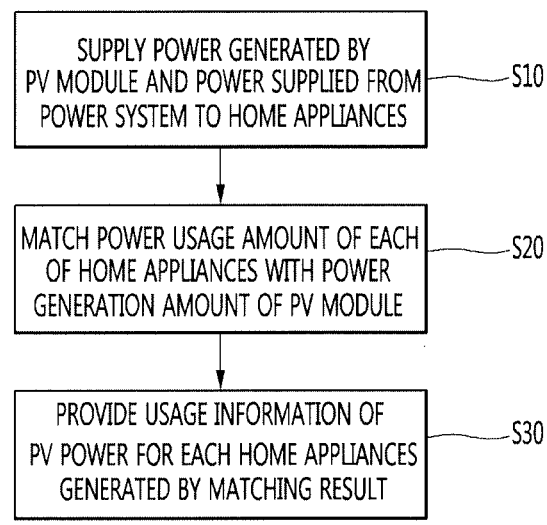
FIG. 4 is a flowchart illustrating an operation method of the home energy management system according to an embodiment.

FIG. 4 is a flowchart illustrating an operation method of the HEMS according to an embodiment.

Referring to FIG. 4, power generated by the PV module 111 and power supplied from the power system 121 may be supplied to the home appliances 151 (S10).

In general, each of the home appliances 151 needs power for operation and may receive as much power from the power system 121 as necessary. Here, when predetermined power is supplied from the PV module 111, the power supplied from the power system 121 may correspond to a difference between power required for the home appliances 151 and the predetermined power from the PV module 111.

That is, assuming that other power supply devices or power consumption device are not provided in the HEMS 10, the sum of the power generated by the PV module 111 and the power supplied from the power system 121 may be the same as the sum of the power supplied to the home appliances 151.

According to an embodiment, the HEMS gateway 100 may control the smart plugs 150 so that the power generated by the PV module 111 and the power supplied from the power system 121 are supplied to the home appliances 151.

The operation S10 will be described with reference to the embodiment of FIG. 5.

Figure 5:
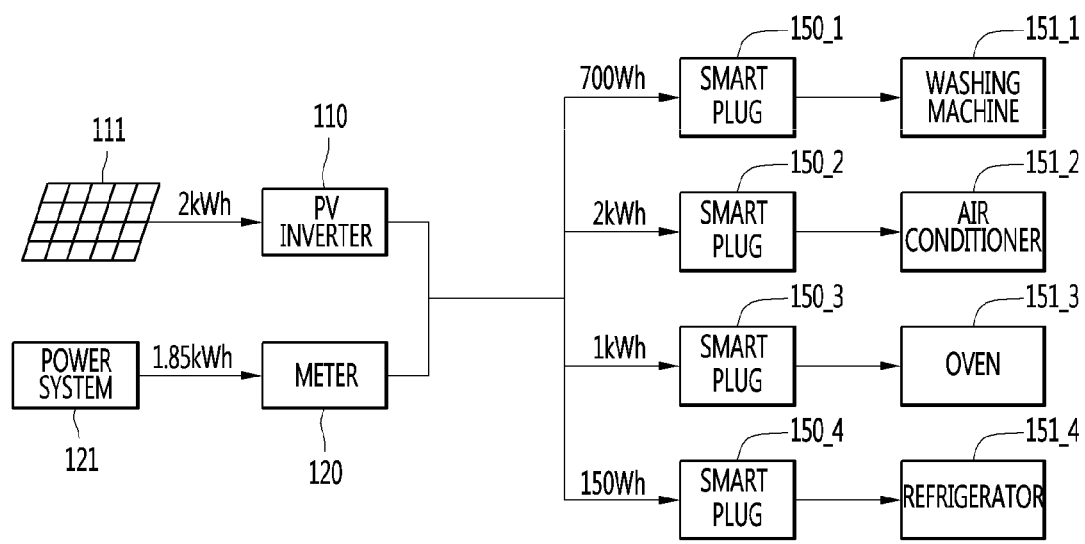
FIG. 5 is a view illustrating an example in which power supplied from a PV module and power supplied from a power system are supplied to home appliances in the home energy management system according to an embodiment.

FIG. 5 is a view illustrating an example in which power supplied from the PV module and power supplied from the power system are supplied to the home appliances in the HEMS 10 according to an embodiment.

In this disclosure, it is assumed that the home appliances 151 include a washing machine 151_1, an air conditioner 151_2, an oven 151_3, and a refrigerator 151_4. However, the home appliances 151_1 to 151_4 illustrated in FIG. 5 are only one example of home appliances in the HEMS 10 for convenience of description, and the kinds of home appliances 151 may be varied.

In FIG. 5, it is assumed that the washing machine 151_1 consumes about 700 Wh of electricity per hour during operation, the air conditioner 151_2 consumes about 2 kWh of electricity per hour during operation, the oven 151_3 consumes about 1 kWh of electricity per hour during operation, and the refrigerator 151_4 consumes about 150 Wh per hour during operation. Information on a power consumption amount per hour of each of the home appliances 151_1 to 151_4 may be stored in the storage unit 320 of the control device 300.

When it is assumed that all of the home appliances 151_1 to 151_4 operate, the sum of power amounts required for the home appliances 151_1 to 151_4 may correspond to about 3.85 kWh. Thus, the power amount corresponding to about 3.85 kWh has to be supplied to the home appliances 151_1 to 151_4.

Here, when the power generation amount generated by the PV module 111 corresponds to about 2 kWh, the power amount supplied from the power system 121 may correspond to about 1.85 kWh. The home appliances 151_1 to 151_4 may receive the power generated by the PV module 111 and the power supplied from the power system 121 to operate.

In general, the power generated by the PV module 111 and the power supplied from the power system 121 may be supplied to each of the home appliances 151_1 to 151_4 through one power path. That is, the generated power and the supplied power may be mixed as one supply power. In this case, it is difficult to determine how much of the power generated by the PV module 111 each of the home appliances 151_1 to 151_4 physically uses.

The description will be made again with reference to FIG. 4.

The control device 300 of the HEMS 10 may match the power usage amount of each of the home appliances 151 and the power generation amount of the PV module 111 (S20).

As described with reference to FIG. 5, it is difficult to determine how much each of the home appliances 151_1 to 151_4 uses the power generated by the PV module 111. Thus, when the control device 300 intends to provide the power usage information for each home appliance to the user, a method for effectively providing the information on how much each of the home appliances uses the power generated by the PV module may be required.

The control device 300 according to an embodiment may set a priority order of each of the home appliances and match the power consumption amount of each of the home appliance with the power generation amount of the PV module 111 on the basis of the set priority order. Particularly, the priority order may be set in various ways for the user to clearly experience the benefit of using the power generated from the PV module 111.

The embodiments with respect to the operation S20 will be described in more detail with reference to FIGS. 6 to 12.

FIG. 6 is a flowchart illustrating an operation of matching the power usage amount of each of the home appliances with the power generation amount of the PV module through the control device.

Referring to FIG. 6, the control device 300 may receive power generation information including the power generation amount of the PV module 111 (S201). As described above, the HEMS gateway 100 may obtain the power generation amount information of the PV module 111 periodically or in real-time from the PV module 111 or the PV inverter 110 to calculate the total power generation amount. The HEMS gateway 100 may transmit the power generation information including the calculated power generation amount to the control device 300. According to an embodiment, the HEMS gateway 100 may transmit the power generation amount information received periodically or in real-time to the control device 300. The control device 300 may calculate the total power generation amount on the basis of the received power generation amount information to generate the power generation information including the calculated total power generation amount.

That is, the power generation amount of the PV module 111 in FIG. 6 may represent the total power generation amount of the PV module 111 during a predetermined period. For example, when the predetermined period is 'one day', the power generation amount of the PV module 111 may represent the total power generation amount for one day.

The control device 300 may receive usage information including the power usage amount of each of the home appliances 151_1 to 151_4 (S202). The HEMS gateway 100 may receive the usage information including the power usage amount of each of the home appliances 151_1 to 151_4 from each of the smart plugs 150_1 to 150_4 respectively connected to the home appliances 151_1 to 151_4. The HEMS gateway 100 may transmit the received usage information of each of the home appliances 151_1 to 151_4 to the control device 300.

Similarly to the operation S201 described above, the power usage amount of each of the home appliances 151_1 to 151_4 may represent the total power usage amount for a predetermined period (for example, 'one day').

The control device 300 may set a matching priority order of each of the home appliances 151_1 to 151_4 on the basis of the received usage information (S203). The matching priority order is for mere effectively showing the benefit of using the PV power generation, and this will be described in more detail with reference to FIGS. 7 and 8.

The control device 300 may match the power usage amount of each of the home appliances 151_1 to 151_4 with the power generation amount of the PV module 111 on the basis of the matching priority order (S204).

The operations S201 to S204 will be described in more detail with reference to FIGS. 7 and 8.

FIG. 7 is view illustrating an example in which the power generation amount of the PV module and the power usage amount of each of the home appliances in the HEMS according to an embodiment.

Referring to FIG. 7, the control device 300 may receive information on the power generation amount of the PV module 111 and the power usage amount of each of the home appliances 151_1 to 151_4 from the HEMS gateway 100. In FIGS. 7 and 8, the power generation amount of the PV module 111 and the power usage amount of each of the home appliances 151_1 to 151_4 may represent a power generation amount and a power usage amount for one day.

Referring to a first table, TABLE 1 in FIG. 7, a power generation amount of the PV module 111 is about 14 kWh. This represents that a power amount corresponding to about 14 kWh, which is generated by the PV module 111, is supplied to the home appliances 151_1 to 151_4.

A power usage amount of the washing machine 151_1 is about 2 kWh, a power usage amount of the air conditioner 151_2 is about 8 kWh. A power usage amount of the oven 151_3 is about 3 kWh, a power usage amount of the refrigerator 151_4 is about 3.6 kWh. Since a power consumption amount per hour of the washing machine 151_1 is about 700 Wh, it is seen that the washing machine 151_1 has been used for about 2 hours and 50 minutes. Since a power consumption amount per hour of the air conditioner 151_2 is about 2 kWh, it is seen that the air conditioner 151_2 has been used for about 4 hours. Since a power consumption amount per hour of the oven 151_3 is about 1 kWh, it is seen that the oven 151_3 has been used for about 3 hours. Finally, since a power consumption amount per hour of the refrigerator 151_4 is about 150 Wh, it is seen that the refrigerator 151_4 has been used for about 24 hours, i.e., throughout the day.

The control device 300 may set a matching priority order for each of the home appliances 151_1 to 151_4. In the embodiment of FIGS. 6 to 8, the matching priority order may be set in a descending order of the power consumption amount per hour of the home appliance or may be set in an ascending order of the total used time.

When the home appliance (e.g., the air conditioner 151_2) having a high power consumption amount per hour, a different in electric charge between a case of operating using the PV power generation and a case of not operating the PV power generation may be greater than that of the home appliance (e.g., the refrigerator 151_4) having a low power consumption amount per hour. That is, when the power usage amount of the air conditioner 151_2 is matched with the PV power generation, the user may clearly experience the benefit of using the PV power generation. Thus, the control device 300 may set a matching priority order in a descending order of the power consumption amount per hour of the home appliances.

According to an embodiment, in case of the home appliance (e.g., the refrigerator 151_4) having a long usage time, it may be required to operate regardless of the PV power. That is, in the case of the refrigerator 151_4, it may operate irrespective of the intention of the user. Thus, even if the PV power is used for the refrigerator 151_4, it may be difficult to allow the user to experience the benefit of using the PV power. On the other hand, in the case of the home appliance (e.g., the washing machine 151_1) having a short usage time, it may generally operate under the intention of the user. Thus, when the washing machine 151_1 uses the PV power, the user may more clearly experience the benefit of using the PV power. Thus, the control device 300 may set a matching priority order in an ascending order of the usage time of the home appliance.

FIG. 8 is a view illustrating an example of results obtained by matching the power usage amount of each of the home appliances with the power generation amount of the PV module through the control device on the basis of the example of FIG. 7.

Referring to FIG. 8, the control device 300 may match the power usage amount of each of the home appliances 151_1 to 151_4 with the power generation amount of the PV module 111 on the basis of the matching priority order set for each of the home appliances 151_1 to 151_4, which are described with reference to FIG. 7.

For example, when the matching priority order is set in the descending order of the power consumption amount per hour, the matching priority order may be set in an order of the air conditioner 151_2, the oven 151_3, the washing machine 151_1, and the refrigerator 151_4.

Referring to the second table, TABLE 2 in FIG. 8, based on the set matching priority order, the control device 300 may match about 8 kWh of the power consumption amount of the air conditioner 151_2 having the highest priority order and about 8 kWh of the power generation amount of the PV module 111. That is, it may be determined that all of about 8 kWh of the power usage amount of the air conditioner 151_2 is supplied from the PV module 111. After the matching, a remaining power generation amount of the PV module 111 may be about 6 kWh. Thus, the control device 300 may match about 3 kWh of the power usage amount of the oven 151_3 having the second priority order with about 3 kWh of the remaining power generation amount. That is, it may be determined that all of about 3 kWh of the power usage amount of the oven 151_3 is supplied from the PV module 111. After the matching, a remaining power generation amount of the PV module 111 may be about 3 kWh. Thus, the control device 300 may match about 2 kWh of the power usage amount of the washing machine 151_1 having the third priority order with about 3 kWh of the remaining power generation amount. That is, it may be determined that all of about 2 kWh of the power usage amount of the washing machine 151_1 is supplied from the PV module 111. After the matching, a remaining power generation amount of the PV module 111 may be about 1 kWh. Thus, the control device 300 may match about 1 kWh of about 3.6 kWh of the power usage amount of the refrigerator 151_4 having the fourth priority order with about 1 kWh of the remaining power generation amount. That is, it may be determined that about 1 kWh of about 3.6 kWh of the power usage amount of the refrigerator 151_4 is supplied from the PV module 111, and the remaining about 2.6 kWh is supplied from the power system 121.

Alternatively, when the matching priority order is set in the ascending order of the total usage time, the matching priority order may be set in an order of the washing machine 151_1, the oven 151_3, the air conditioner 151_2, and the refrigerator 151_4. Similarly, when the power usage amount of each of the home appliances 151_1 to 151_4 is matched with the power generation amount of the PV module 111, it may be determined that about 2 kWh of the power usage amount of the washing machine 151_1, about 3 kWh of the power usage amount of the oven 151_3, about 8 kWh of the power usage amount of the air conditioner 151_2, and about 1 kWh of about 3.6 kWh of the power usage amount of the refrigerator 151_4 are supplied from the PV module 111.

Although not described in FIGS. 6 to 8, the matching priority may be set in the descending order of the number of times in which the home appliances are switched from On to OFF or from OFF to On by the user. That is, the control device 300 may set the matching priority order in order of the home appliances frequently used by the user and match the power usage amount of the home appliances with the power generation amount of the PV module 111 on the basis of the set matching priority order. Thus, the user may clearly experience the benefit obtained by operating the home appliances frequently used by the user by using the PV power.

Also, in addition to the above-described examples, the matching priority may be set based on various criteria for effectively providing the benefit of using the PV power.

Figures 9, 10:
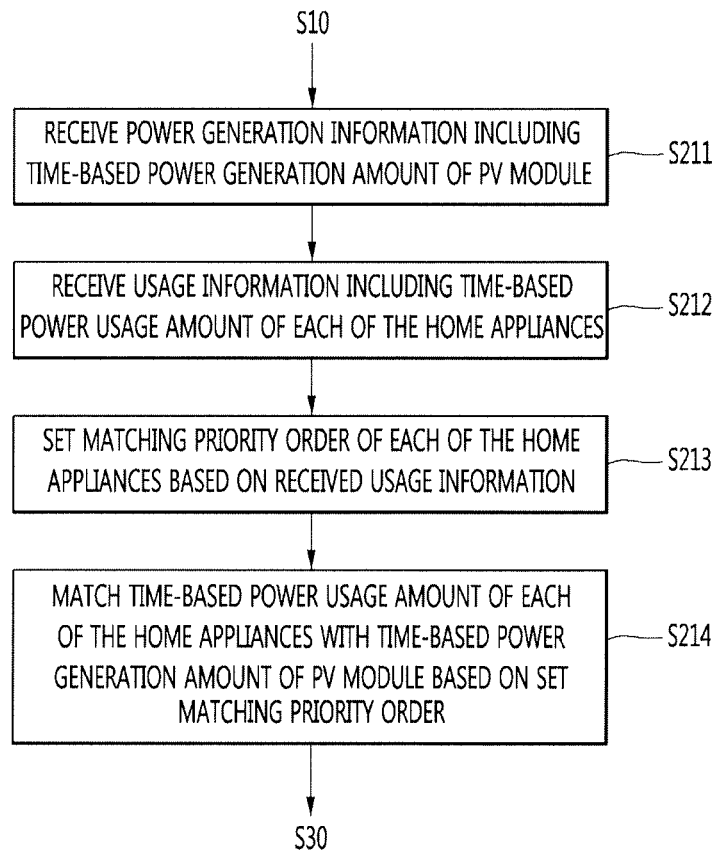
FIG. 9 is a flowchart illustrating an example of an operation of matching a time-based power usage amount of each of the home appliances and a time-based power generation amount of the PV module through the control device.
FIG. 10 is a view illustrating an example of the time-based power generation amount of the PV module.

FIG. 9 is a flowchart illustrating an example of an operation of matching a time-based power usage amount of each of the home appliances and a time-based power generation amount of the PV module through the control device.

Referring to FIG. 9, the control device 300 may receive power generation information including a time-based power generation amount of the PV module 111 (S211). Particularly, the HEMS gateway 100 may obtain the power generation amount information of the PV module 111 periodically or in real-time from the PV module 111 or the PV inverter 110 to generate the generation information including the time-based power generation amount. The HEMS gateway 100 may transmit the generated power generation information to the control device 300. According to an embodiment, the HEMS gateway 100 may transmit the power generation amount information received periodically or in real-time to the control device 300. The control device 300 may calculate the time-based power generation amount on the basis of the received power generation amount information to generate the power generation information including the calculated time-based power generation amount.

The control device 300 may receive usage information including the time-based power usage amount of each of the home appliances 151_1 to 151_4 (S212).

The HEMS gateway 100 may receive the power usage amount of each of the home appliances 151_1 to 151_4 periodically or in real-time from each of the smart plugs 150_1 to 150_4 respectively connected to the home appliances 151_1 to 151_4. The HEMS gateway 100 may calculate the time-based power usage amount on the basis of the power usage amount of each of the home appliances 151_1 to 151_4, which is received periodically or in real-time. The HEMS gateway 100 may transmit the usage information including the calculated time-based power generation amount to the control device 300. According to an embodiment, the HEMS gateway 100 may transmit the power usage information of each of the home appliances 151_1 to 151_4, which is received periodically or in real-time, to the control device 300. The control device 300 may calculate the time-based power usage amount of each of the home appliances 151_1 to 151_4 (S212) on the basis of the received power usage amount.

The control device 300 may set a matching priority order of each of the home appliances 151_1 to 151_4 on the basis of the usage information (S213). The control device 300 may match the power usage amount of each of the home appliances 151_1 to 151_4 with the power generation amount of the PV module 111 on the basis of the matching priority order (S214).

The operations S211 to S214 will be described in more detail with reference to FIGS. 10 to 12.

FIG. 10 is a view illustrating an example of the time-based power generation amount of the PV module.

Referring to FIG. 10, the third table, TABLE 3 may include the information on the time-based power generation amount of the PV module 111. The HEMS gateway 100 may receive the information on the time-based power generation amount of the PV module 111 from the PV module or the PV inverter 110 to transmit the received information to the control device 300.

According to an embodiment of FIG. 10, the total power generation amount from 8:00 hours to 9:00 hours is about 0.8 kWh, and the total power generation amount from 9:00 hours to 11:00 hours is about 2.5 kWh. The total power generation amount from 11:00 hours to 15:00 hours is about 8 kWh, the total power generation amount from 15:00 hours to 17:00 hours is about 3 kWh, and the total power generation amount from 17:00 hours to 19:00 hours is about 0.5 kWh. In general, a power generation amount from 11:00 hours to 15:00 hours with a high sunlight irradiation angle may be higher than other time zones, but this may vary depending on weather and the like.

The control device 300 may store the time-based power generation amount information of the PV module 111 in the storage unit 320. Also, the control device 300 may transmit the time-based power generation amount information to the terminal 400 to provide the time-based power generation amount information of the PV module 111 to the user.

FIG. 11 is a view illustrating an example of the time-based power usage amount of each of the home appliances.

Referring to FIG. 11, the control device 300 may receive information on the time-based power usage amount of each of the home appliances 151_1 to 151_4 from the HEMS gateway 100.

Referring to a fourth table, TABLE 4 in FIG. 11, in a time zone from 8:00 hours to 9:00 hours, it is seen that a power usage amount of the washing machine 151_1 is about 700 Wh, a power usage amount of the air conditioner 151_2 is 0, a power usage amount of the oven 151_3 is about 500 Wh, and a power usage amount of the refrigerator 151_4 is about 150 Wh. That is, it is seen that the home appliances operating in the time zone from 8:00 hours to 9:00 hours are the washing machine 151_1, the oven 151_3, and the refrigerator 151_4.

In a time zone from 9:00 hours to 11:00 hours, it is seen that the power usage amount of the washing machine 151_1 is about 700 Wh, the power usage amount of the air conditioner 151_2 is about 2 kWh, the power usage amount of the oven 151_3 is 0, and the power usage amount of the refrigerator 151_4 is about 300 Wh. That is, it is seen that the home appliances operating in the time zone from 9:00 hours to 11:00 hours are the washing machine 151_1, the air conditioner 151_2, and the refrigerator 151_4.

Also, in a time zone from 11:00 hours to 15:00 hours, it is seen that the power usage amount of the washing machine 151_1 is 0, the power usage amount of the air conditioner 151_2 is about 7.5 kWh, the power usage amount of the oven 151_3 is about 250 Wh, and the power usage amount of the refrigerator 151_4 is about 600 Wh. That is, it is seen that the home appliances operating in the time zone from 11:00 hours to 15:00 hours are the air conditioner 151_2, the oven 151_3, and the refrigerator 151_4.

Referring again to the fourth table, TABLE 4 in FIG. 11, in a time zone from 15:00 hours to 17:00 hours, it is seen that the power usage amount of the washing machine 151_1 is 0, the power usage amount of the air conditioner 151_2 is about 3 kWh, the power usage amount of the oven 151_3 is 0, and the power usage amount of the refrigerator 151_4 is about 300 Wh. That is, it is seen that the home appliances operating in the time zone from 15:00 hours to 17:00 hours are the air conditioner 151_2 and the refrigerator 151_4.

Finally, in the time zone from 17:00 hours to 19:00 hours, it is seen that the power usage amounts of the washing machine 151_1 and the air conditioner 151_2 are 0, the power usage amount of the oven 151_3 is about 500 Wh, and the power usage amount of the refrigerator 151_4 is about 300 Wh. That is, it is seen that the home appliances operating in the time zone from 17:00 hours to 19:00 hours are the oven 151_3 and the refrigerator 151_4.

The control device 300 may set a matching priority order for each of the home appliances 151_1 to 151_4. Similar to the embodiment of FIGS. 6 to 8, the matching priority order may be set in a descending order of the power consumption amount per hour of the home appliance. In this case, the control device 300 may set the matching priority order in order of the air conditioner 151_2, the oven 151_3, the washing machine 151_1, and the refrigerator 151_4.

According to an embodiment, the matching priority order may be set differently in the time zones. For example, the matching order may be set in order of the total power consumption amount of the home appliances in the time zones. In this case, in the time zone from 8:00 hours to 9:00 hours, the matching priority order may be set in order of the washing machine 151_1, the oven 151_3, and the refrigerator 151_4. In the time zone from 9:00 hours to 11:00 hours, the matching priority order may be set in order of the air conditioner 151_2, the washing machine 151_1, and the refrigerator 151_4. In the time zone from 11:00 hours to 15:00 hours, the matching priority order may be set in order of the air conditioner 151_2, the refrigerator 151_4, and the oven 151_3. In the time zone from 15:00 hours to 17:00 hours, the matching priority order may be set in order of the air conditioner 151_2 and the refrigerator 151_4, and in the time zone from 17:00 hours to 19:00 hours, the matching priority order may be set in order of the oven 151_3 and the refrigerator 151_4.

FIG. 12 is a view illustrating an example of results obtained by matching the time-based power usage amount of each of the home appliances and the time-based power generation amount of the PV module through the control device on the basis of the example of FIGS. 10 and 11.

Referring to FIG. 12, the control device 300 may match the time-based power usage amount of each of the home appliances 151_1 to 151_4 with the time-based power generation amount of the PV module 111 on the basis of the matching priority order set for each of the home appliances 151_1 to 151_4, which are described with reference to FIG. 11.

Referring to a fifth table, TABLE 5 in FIG. 12, it is seen that the washing machine 151_1, the oven 151_3, and the refrigerator 151_4 use the power in the time zone from 8:00 hours to 9:00 hours. The control device 300 may match about 500 Wh of the power usage amount of the oven 151_3 having the highest priority order of the home appliances using the power with about 500 Wh of the power generation amount of the PV module 111. That is, it is determined that all of about 500 Wh of the power usage amount of the oven 151_3 is supplied from the PV module 111. After the matching, a remaining power generation amount of the PV module 111 may be about 300 Wh. Thus, the control device 300 may match about 300 Wh of the 700 Wh of the power usage amount of the washing machine 151_1 having the second priority order of the home appliances using the power with about 300 Wh of the remaining power generation amount. That is, it may be determined that about 300 Wh of about 700 Wh of the power usage amount of the washing machine 151_1 is supplied from the PV module 111, and the remaining 400 Wh is supplied from the power system 121.

Similarly, in the matching result for different time zones, about 2 kWh of the power usage amount of the air conditioner 151_2 may match about 2 kWh of the power generation amount of the PV module 111 in the time zone from 9:00 hours to 11:00 hours. Also, about 500 Wh of about 700 Wh of the power usage amount of the washing machine 151_1 may match 500 Wh of the power generation amount of the PV module 111. In the time zone from 11:00 hours to 15:00 hours, about 7.5 kWh of the power usage amount of the air conditioner 151_2 may match about 7.5 kWh of the power generation amount of the PV module 111. Also, about 250 Wh of the power usage amount of the oven 151_3 may match 250 Wh of the power generation amount of the PV module 111, and about 250 Wh of about 600 Wh of the power usage amount of the refrigerator 151_4 may match 250 Wh of the power generation amount of the PV module 111. Also, in the time zone from 15:00 hours to 17:00 hours, about 3 kWh of the power usage amount of the air conditioner 151_2 may match about 3 kWh of the power generation amount of the PV module 111. Finally, in the time zone from 17:00 hours to 19:00 hours, about 500 Wh of the power usage amount of the oven 151_3 may match about 500 Wh of the power generation amount of the PV module 111.

The description will be made again with reference to FIG. 4.

The control device 300 may provide the usage information of the PV power for each home appliance, which is generated by the matching result (S30).

The control device 300 may match the power usage amount of each of the home appliances 151 with the power generation amount of the PV module 111 and acquire the usage information of the PV power for each home appliance as illustrated in FIG. 8 or 12 on the basis of the matching result.

The control device 300 may generate power consumption information for each home appliance, which includes the acquired usage information, to store the generated power consumption information for each home appliance in the storage unit 320. Also, the control device 300 may transmit the generated power consumption information for each home appliance to the terminal 400. The terminal 400 may display the received power consumption information for each home appliance through a display unit to provide the power consumption information to the user.

Examples of the power consumption information for each home appliance will be described with reference to FIG. 13.

FIG. 13 is a view illustrating an example of the power consumption information of the home appliances, which is supplied to the terminal by the control device, on the basis of the matching result.

As illustrated in FIGS. 4 to 12, the control device 300 may match the power usage amount of each of the home appliances with the power generation amount of the PV module 111. The control device 300 may acquire the usage information of the PV power for each home appliance on the basis of the matching result. The control device 300 may generate the power consumption information for each home appliance, which includes the acquired usage information of the PV power for each home appliance. Also, the control device 300 may store the generated power consumption information for each home appliance in the storage unit 320 or transmit the generated power consumption information for each home appliance to the terminal 400.

Referring to FIG. 13, the terminal 400 may display the power consumption information for each home appliance, which is received from the control device 300, through the display unit. A power consumption information screen 401 illustrated in FIG. 13 is only an example for convenience of description, and the form and configuration of the power consumption information screen 401 are not limited thereto.

For example, the power consumption information screen 401 may include at least one of the name of the home appliance, the total power usage amount information, the usage information of the PV power described in FIG. 4, the power usage amount information supplied from the power system 121, and generated electric charge information. That is, the control device 300 may generate the power consumption information including the total power usage amount information, the usage information of the PV power, the power usage amount information supplied from the power system 121, and the generated electric charge information to transmit the generated power consumption information to the terminal 400.

The total power usage information represents the total amount of power used for the corresponding home appliance for a predetermined time. Although the power consumption information screen 401 is shown as providing the power consumption information for one day in FIG. 13, the period may be freely changed.

According to an embodiment, the power consumption information screen 401 may further include charge information corresponding to the total power usage amount information. In FIG. 13, it is seen that the power used for one day by the washing machine 151_1 is about 1.2 kWh, and the electric charge is about $0.54. The corresponding electric charge represents an electric charge when all of the 1.2 kWh is supplied from the power system 121.

The power consumption information screen 401 may include the usage information of the PV power and the usage amount information of the power supplied from the power system 121. Referring again to FIG. 13, it is seen that about 800 Wh of the power used for one day by the washing machine 151_1 is the power supplied from the PV module 111, and about 400 Wh is the power supplied from the power system 121.

The generated electric charge information may correspond to the usage amount of the power supplied from the electric power system 121 among the total power consumption amount of the home appliances. In FIG. 13, the power supplied from the power system 121 of the washing machine 151_1 is about 400 Wh, and the electric charge for about 400 Wh is about $0.18, so that the daily electric charge of the washing machine 151_1 may be about $0.18. That is, it is seen that the actual electric charge is about $0.18 with respect to the electric charge of about $0.54 corresponding to the total power consumption information. Therefore, the user may know that the electric charge of about $0.36 has been reduced by using the power generated from the PV module 111 when using the washing machine 151_1.

The control device 300 may provide the power consumption information for each appliance to the user so that the user may easily check the power consumption status of the appliances. Also, the control device 300 may set the priority order of each of the home appliances to match the power usage amount of each home appliance and the generation amount of PV module on the basis of the set priority order. The control device 300 may more effectively provide the benefit of using the power generated by the PV module 111 to the user through the power consumption information matched according to the priority order, and the user may clearly experience the benefit. Since the user clearly experiences the above benefit, the home appliances may be used to maximize the benefit of using the PV power.

Hereinafter, an operation performed by the control device 300 according to the embodiment will be described based on the predicted power generation amount of the PV module 111 will be described according to an embodiment.

FIG. 14 is a flowchart illustrating an operation method of the control device according to an embodiment.

Referring to FIG. 14, the control device 300 may predict the time-based power generation amount of the PV module 111 (S1400).

For example, the control device 300 may predict the time-based power generation amount of the PV module 111 on the basis of the power generation performance of the PV module 111, the weather forecast, the past power generation amount information, the sunlight irradiation angle, and the like.

The power generation performance and the past power generation amount information may be previously stored in the storage unit 320. Also, in the case of the information related to the weather forecast or the sunlight irradiation angle, the control device 300 may receive the information from the meteorological service server connected through the network or may acquire related information through the Internet.

In this disclosure, the control device 300 may predict the power generation amount of the PV module 111 in each time zone. However, according to another embodiment, the control device 300 may add the daily power generation amount of the PV module 111 to predict the power generation amount.

The control device 300 may generate information on a usable time of the home appliances on the basis of the predicted result of the time-based power generation amount of the PV module 111 (S1410).

The control device 300 may generate information on a usable time of each of the home appliances connected to the HEMS gateway 100 on the basis of the time-based power generation amount of the PV module 111, which is predicted in the operation S1400. For this, the control device 300 may store information of the home appliances connected to the HEMS gateway 100 and information on an average power consumption of each of the home appliances in the storage unit 320.

According to an embodiment, the control device 300 may store information of the smart plugs respectively connected to the home appliances instead of the information of the home appliances in the storage unit 320.

The control device 300 may transmit the information generated in the operation S1410 to the terminal 400 connected to the control device 300 (S1420).

The terminal 400 may display the received information through the display unit to provide the information to the user. The user may determine whether or not to use each home appliance for each time on the basis of the displayed information.

The operations S1400 to S1420 will be described in more detail with reference to FIGS. 15 and 16.

FIG. 15 is a table showing predicted results of the time-based power generation amount when the control device predicts the time-based power generation amount of the PV module according to an embodiment.

FIG. 15 shows the sixth table, TABLE 6 including the prediction information on the time-based power generation amount of the PV module 111. The control device 300 may generate the prediction information on the basis of the power generation performance of the PV module 111, the weather forecast, the past generation amount information, and/or the sunlight irradiation angle as described above.

According to an embodiment of FIG. 15, the predicted power generation amount from 8:00 hours to 9:00 hours is about 1 kWh, and the predicted power generation amount from 9:00 hours to 11:00 hours is about 2 kWh. The predicted power generation amount from 11:00 hours to 15:00 hours is about 2.5 kWh, the predicted power generation amount from 15:00 hours to 17:00 hours is about 1.5 kWh, and the predicted power generation amount from 17:00 hours to 19:00 hours is about 0.5 kWh. In general, a power generation amount from 11:00 hours to 15:00 hours with a high sunlight irradiation angle may be higher than other time zones, but this may vary depending on weather forecasts and the like.

According to an embodiment, the control device 300 may store the generated prediction information. Also, the control device 300 may transmit the generated prediction information to the terminal 400 to provide the prediction information to the user.

FIG. 16 is a table showing information on a usable time of each of the home appliances, which is generated by the control device on the basis of the predicted results of the time-based power generation amount of FIG. 15.

In FIG. 16, it is assumed that the home appliances are a washing machine and an air conditioner for convenience of explanation. However, according to the embodiment, the types and the number of home appliances may vary.

Referring to FIGS. 15 and 16, the control device 300 may generate information on a usable time of each of the home appliances on the basis of the generated prediction information. The usable time of each of the home appliances may represent a time zone in which the home appliances may be used only by the power generated by the PV module 111.

Hereinafter, the usable time of each of the home appliances will be described with reference to the sixth table, TABLE 6 in FIG. 15, and the seventh table, TABLE 7 in FIG. 16. In this disclosure, although it is assumed that the power consumption of the washing machine is about 700 Wh per hour, and the power consumption of the air conditioner is about 2 kWh per hour, the power consumption of the washing machine and the air conditioner may vary according to the embodiment.

Since the predicted power generation amount from 8:00 hours to 9:00 hours is about 1 kWh per hour, the control device 300 may determine that the washing machine may be used in the corresponding time zone, and the use of the air conditioner is impossible.

On the other hand, since the predicted power generation amount from 9:00 hours to 11:00 hours is about 2 kWh per hour, and the predicted power generation amount from 11:00 hours to 15:00 hours is about 2.5 kWh per hour, the control device 300 may determine that the washing machine may be used in the corresponding time zone, and the air conditioner may also be used. However, the information on the usable time of each of the home appliances shown in the seventh table, TABLE 7 in FIG. 16, represents whether or not the washing machine and the air conditioner are usable, but does not include information whether the washing machine and the air condition are usable at the same time.

Since the predicted power generation amount from 15:00 hours to 17:00 hours is about 1.5 kWh per hour, the control device 300 may determine that the washing machine may be used in the corresponding time zone, and the use of the air conditioner is impossible. Finally, since the predicted power generation amount from 17:00 hours to 19:00 hours is about 0.5 kWh per hour, the control device 300 may determine that the use of the washing machine and the air conditioner in the corresponding time zone may be impossible.

The control device 300 may generate the information on the usable time of each of the home appliances on the basis of the determination result of the availability of the home appliances for each time. Also, the control device 300 may store the generated information in the storage unit 320 or transmit the generated information to the terminal 400. The terminal 400 may display the received information through the display unit to inform the information to the user. The user may determine an optimal usable time zone of the washing machine or the air conditioner on the basis of the information.

Figures 17, 18:
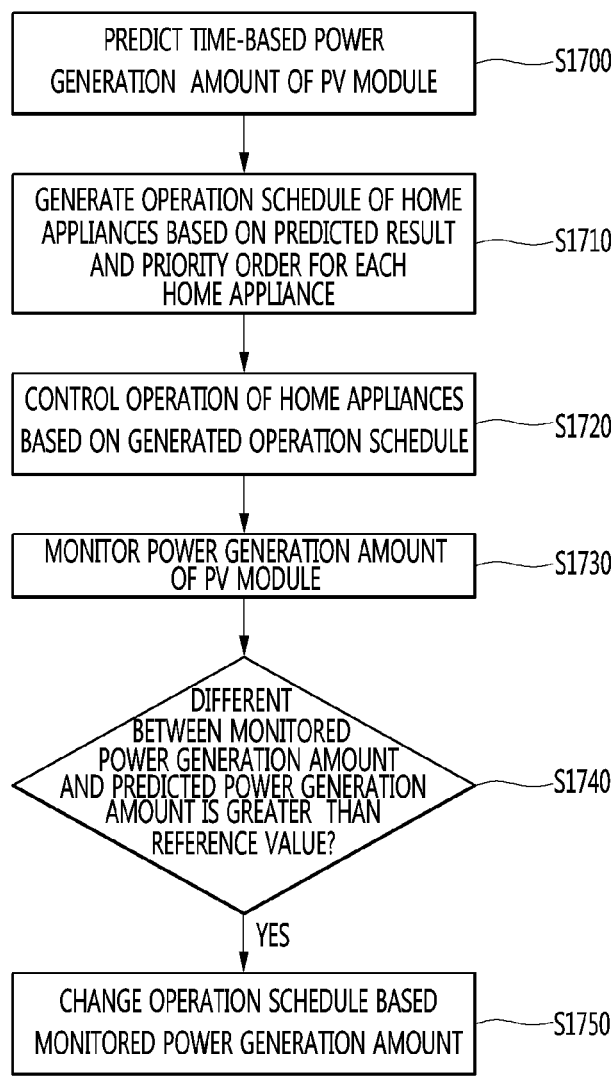
FIG. 17 is a flowchart for illustrating a method for controlling operations of the home appliances through the control device on the basis of the predicted results of the time-based power generation amount of the PV module according to an embodiment.
FIG. 18 is a view illustrating an example of priority order information set with respect to each of the home appliances.

FIG. 17 is a flowchart illustrating a method for controlling operations of the home appliances through the control device on the basis of the predicted results of the time-based power generation amount of the PV module according to an embodiment.

Referring to FIG. 17, the control device 300 may predict the time-based power generation information of the PV module 111 (S1700). The operation S1700 is substantially the same as the operation S1400, and thus, its description will be omitted.

The control device 300 may generate an operation schedule of the home appliances on the basis of the predicted power generation amount and the priority order of the home appliances (S1710).

The priority order of the home appliances may be set in various manners. For example, average power consumption information of each of the home appliances may be stored in the storage unit 320 of the control device 300. In this case, the control device 300 may set the priority order of each of the home appliances in descending or ascending order of the power consumption on the basis of the stored average power consumption information of each of the home appliances.

According to an embodiment, the usable time zone information of each of the home appliances may be stored in the storage unit 320. In this case, the control device 300 may set the priority order of the home appliances that are most frequently used for each time zone to a high priority order, and set the priority order of the home appliances having a low frequency of use to a low priority order. That is, the control device 300 may set the priorities of the home appliances differently according to the time zone.

According to another embodiment, the control device 300 may receive information for setting the priority order of the home appliances from the terminal 400 and may set the priority order for each home appliance on the basis of the received information. Particularly, the terminal 400 may receive a priority order reference from the user or directly receive the priority order of each of the home appliances. The terminal 400 may transmit information including the input priority order reference or the priority order of each of the appliances to the control device 300. The control device 300 may set the priority order for each home appliance on the basis of the received information.

Since the above-described priority order setting methods for each appliance are merely examples for convenience of explanation, the control device 300 may set priority orders for each appliance by various methods.

Also, the control device 300 may store the set priority order for each home appliance in the storage unit 320 or transmit the set priority order to the terminal 400. The terminal 400 may display the received priority order through the display unit. According to an embodiment, the terminal 400 may receive a modification request from the user on the basis of the displayed priority order. In this case, the terminal 400 may transmit the modification request to the control device 300, and the control device 300 may modify the priority order in response to the received modification request.

With reference the operation S1710, a specific example of the priority order of each appliance and the operation schedule of home appliances will be described with reference to FIGS. 18 to 19.

FIG. 18 is a view illustrating an example of priority order information set with respect to each of the home appliances.

Although the priority order information for each of the air conditioner, the washing machine, the refrigerator, and the dishwasher is illustrated in FIG. 18, the kinds of home appliances may vary according to the embodiment.

Referring to FIG. 18, the control device 300 may set the priority order with respect to the air conditioner, the washing machine, the refrigerator, and the dishwasher. Although the priority order of the home appliances is illustrated to be set differently according to the time zone in FIG. 18, the priority order of the home appliances according to the embodiment may be set to be constant regardless of the time zone.

The control device 300 may set the priority order for each time zone on the basis of the usable time zone information of the air conditioner, the washing machine, the refrigerator, and the dishwasher. As described above, the usable time zone information may be previously stored in the storage unit 320. The usable time zone information may include information on the frequency of use of each of the home appliances for each time zone for a predetermined period (e.g., '3 months', etc.). Here, the frequency of use may represent the sum of the number of days when the home appliance operates in the corresponding time zone. That is, the frequency of use is the sum of the number of days when the home appliances operating in the corresponding time zone for the predetermined period (3 months) (for example, in the time zone from 8:00 hours to 11:00 hours, '90 days' in case of the refrigerator, '30 days' in the case of the washing machines, and '5 days' in the case of the air conditioners, etc.).

Referring to the eighth table, TABLE 8 in FIG. 18, when the frequency of use is high in the order of the refrigerator, the dishwasher, the washing machine, and the air conditioner in the time zone from 8:00 hours to 11:00 hours, the control device 300 may set the priority order so that the priority of the refrigerator is first, the priority of the dishwasher is second, the priority of the washing machine is third, and the priority order of the air conditioner is fourth.

Referring to the eighth table, TABLE 8 in FIG. 18, according to the above-described priority order, since the frequency of use increase in order of the refrigerator, the air conditioner, the washing machine, and the dishwasher in the time zone from 11:00 hours to 15:00 hours, the control device 300 may set the priority order of the refrigerator first, the priority order of the air conditioner second, the priority order of the washing machine third, and the priority order of the dishwasher fourth. In the time zone from 15:00 hours to 17:00 hours, since the frequency of use increase in order of the refrigerator, the washing machine, the air conditioner, and the dishwasher, the control device 300 may set the priority order of the refrigerator first, the priority order of the washing machine second, the priority order of the air conditioner third, and the priority order of the dishwasher fourth. Finally, in the time zone from 17:00 hours to 19:00 hours, since the frequency of use increase in order of the refrigerator, the dishwasher, the washing machine, and the air conditioner, the control device 300 may set the priority order of the refrigerator first, the priority order of the dishwasher second, the priority order of the washing machine third, and the priority order of the air conditioner fourth.

According to an embodiment, the control device 300 may receive the priority order information for each home appliance from the terminal 400. In this case, the priority order information for each home appliance may be automatically generated by the terminal 400 or manually generated by the user for the terminal 400.

FIG. 19 is a view illustrating an example of an operation schedule of each of the home appliances, which is generated by the control device on the basis of the embodiments of FIGS. 15 and 18, according to an embodiment.

Here, it is assumed that the power consumption of the air conditioner of the home appliances is about 2 kWh per hour, the power consumption of the washing machine is about 700 Wh per hour, the power consumption of the refrigerator is about 150 Wh per hour, and the power consumption of the dishwasher is about 500 Wh per hour.

The control device 300 may generate operation schedules of the home appliances on the basis of the predicted power generation amount of the PV module 111 and the priority order information of each home appliance.

Referring to FIGS. 15, 18, and 19, the estimated power generation amount from 8:00 hours to 9:00 hours is about 1 kWh per hour, and the sum of the power consumption of the refrigerator having the first priority order and the dishwasher having the second priority order is about 650 Wh per hour. Thus, the control device 300 may classify the refrigerator and the dishwasher as operable devices in the time zone from 8:00 hours to 9:00 hours. According to an embodiment, to use all the power generated by the PV module 111, the control device 300 may include the washing machine having the third priority order as the operable device.

The estimated power generation amount from 9:00 hours to 11:00 hours is about 2 kWh per hour, and the sum of the power consumption of the refrigerator, the dishwasher, and the washing machine is about 1.35 kWh per hour. Thus, the control device 300 may classify the refrigerator, the dishwasher, and the washing machine as operable devices in the time zone from 9:00 hours to 11:00 hours. According to an embodiment, to use all the power generated by the PV module 111, the control device 300 may include the air conditioner having the fourth priority order as the operable device.

The estimated power generation amount from 11:00 hours to 15:00 hours is about 2.5 kWh per hour, and the sum of the power consumption of the refrigerator and the air conditioner is about 2.15 kWh per hour. Thus, the control device 300 may classify the refrigerator and the air conditioner as operable devices in the time zone from 11:00 hours to 15:00 hours. According to an embodiment, to use all the power generated by the PV module 111, the control device 300 may include the washing machine having the third priority order as the operable device.

Referring again to FIGS. 15, 18, and 19, the estimated power generation amount from 15:00 hours to 17:00 hours is about 1.5 kWh per hour, and the sum of the power consumption of the refrigerator and the washing machine is about 850 Wh per hour. Thus, the control device 300 may classify the refrigerator and the washing machine as operable devices in the time zone from 15:00 hours to 17:00 hours. Here, when the air conditioner having the third priority order operates, the total power consumption is about 2.85 kWh per hour, which is higher than the predicted power generation amount. However, when the washing machine having the fourth priority order operates, the total power consumption is about 1.35 kWh per hour, which is lower than the predicted power generation amount. Thus, the control device 300 may classify not only the refrigerator and the washing machine but also the dishwasher as the operable devices. According to an embodiment, to use all the power generated by the PV module 111, the control device 300 may also include the air conditioner as the operable device.

Finally, the estimated power generation amount from 17:00 hours to 19:00 hours is about 0.5 kWh per hour, and the power consumption of the refrigerator is about 150 Wh per hour. Thus, the control device 300 may classify only the refrigerator as the operable device in the time zone from 17:00 hours to 19:00 hours. According to an embodiment, to use all the power generated by the PV module 111, the control device 300 may include the dishwasher having the second priority order as the operable device.

As described above, the control device 300 may classify at least a portion of the home appliances for each time zone as the operable device on the basis of the prediction information on the power generation amount of the PV module 111 for each time zone and the priority order information of the home appliances for each time zone. The control device 300 may generate the operation schedule of the home appliances on the basis of the information of the operable devices, which are classified for each time zone. That is, the operation schedule may include information on whether the home appliances are operable for each time zone. Thus, the operation schedule may represent one embodiment of the information on the usable time for each appliance, which is described above with reference to FIG. 14.

Also, the control device 300 may store the generated operation schedule in the storage unit 320 or transmit the generated operation schedule to the terminal 400.

The description will be made again with reference to FIG. 17.

The control device 300 may control an operation of each of the home appliances 151 on the basis of the generated operation schedule (S1720).

Particularly, the control device 300 may control an operation of each of the home appliances 151 on the basis of the generated operation schedule so that the home appliances 151 operate or do not operate. For this, the control device 300 may transmit a control signal for controlling the operation of each of the home appliances 151 to the HEMS gateway 100. The HEMS gateway 100 may transmit a power supply signal or a power cutoff signal to each of the smart plugs 150 respectively connected to the home appliances 151 on the basis of the received control signal.

The smart plugs 150 may supply power to the home appliances 151 connected to the smart plugs 150 in response to the received power supply signal. In this case, since the power is supplied to the home appliances 151, the home appliances 151 may operate. Also, the smart plugs 150 may cut off the power supply to the home appliances 151 in response to the received power cutoff signal. In this case, since the power is not supplied to the home appliances 151, the home appliances 151 may not operate.

According to an embodiment, when the HEMS gateway 100 and the home appliances 151 are directly connected to each other, the HEMS gateway 100 may transmit an operation signal or an operation stop signal to the home appliances 151 on the basis of the control signal received from the control device 300. Each of the home appliances 151 may perform an operation in response to the received operation signal, or may stop the operation in response to the operation stop signal.

The control device 300 may automatically generate the operation schedules of the home appliances on the basis of the predicted power generation amount of the PV module 111 and the priority order information set for each home appliance. The control device 300 may provide an effect of enabling the efficient use of the PV power by controlling the operations of the household appliances on the basis of the generated operation schedules.

Referring to FIG. 17, according to an embodiment, the control device 300 may monitor the power generation amount of the PV module 111 (S1730).

The PV module 111 or the PV inverter 110 may transmit the power generation amount information of the power generated from the PV module 111 to the HEMS gateway 100, and the HEMS gateway 100 may control the received generation amount information to the control device 300. The control device 300 may monitor the power generation amount of the PV module 111 by receiving the power generation amount information from the HEMS gateway 100.

If a difference between the monitored power generation amount and the predicted power generation amount is equal to or greater than a reference value (YES in operation S1740), the control device 300 may change the operation schedule on the basis of the monitored power generation amount (S1750).

Since the power generation amount predicted by the control device 300 is generated based on the weather forecasts and the like, a difference may occur due to factors such as weather changes and cloud effects. Thus, the control device 300 may calculate a difference between the actual power generation amount of the PV module 111 and the predicted power generation amount and may change the operation schedule when the calculated difference is equal to or greater than the reference value.

FIG. 20 is a view illustrating an example of an operation schedule that is changed by the control device when the power generation amount of the PV module and the predicted power generation amount are different from each other.

Referring to FIGS. 15 and 18 to 20, the estimated power generation amount from 17:00 hours to 19:00 hours is about 0.5 kWh per hour, and the control device 300 may generate an operation schedule for classifying the refrigerator as an operable device between 17:00 hours to 19:00 hours on the basis of the predicted power generation amount.

The control device 300 may monitor the power generation amount of the PV module 111 by receiving the power generation amount information through the HEMS gateway 100. Here, it is assumed that the power generation amount information received through the HEMS gateway 100 corresponds to about 0.7 kWh per hour, and a difference between the monitored power generation amount and the predicted power generation amount is equal to or greater than the reference value.

The control device 300 may change the operation schedule when the difference between the monitored power generation amount and the predicted power generation amount is equal to or greater than the reference value. When comparing the ninth table, TABLE 9, of FIG. 19 to the tenth table, TABLE 10, of FIG. 20, it is seen that the devices capable of operating in the time zone from 17:00 hours to 19:00 hours are changed from the refrigerator to the refrigerator and the dishwasher. That is, the control device 300 may change the operation schedule to classify the refrigerator and the dishwasher as the operable devices on the basis of the monitored power generation amount that is about 0.7 kWh per hour. That is, the control device 300 may actively control the operations of the home appliances on the basis of the actual power generation amount. Thus, the power generated by the PV module 111 may be more efficiently used.

FIGS. 21A and 21B are views illustrating examples of the power usage information for each home appliance, which is provided to a terminal by the control device, respectively.

As illustrated in FIGS. 14 to 20, the control device 300 may control the operations of the home appliances on the basis of the predicted power generation amount of the PV module 111 as described above. The control device 300 may acquire the power consumption information of the home appliances on the basis of the controlled result. For example, the HEMS gateway 100 may receive the power consumption information from each of the smart plugs respectively connected to the home appliances and may transmit the received power consumption information of each of the home appliances to the control device 300. The control device 300 may acquire the power consumption information on the basis of the received power usage amount information of each of the home appliances. The acquired power consumption information may be stored in the storage unit 320 or provided to the terminal 400.

Referring to FIGS. 21A and 21B, the terminal 400 may display the power consumption information for each home appliance, which is received from the control device 300, through the display unit. Power consumption information screen 403 and 404 illustrated in FIGS. 21A and 2B is only an example for convenience of description, and the form and configuration of the power consumption information screens 403 and 404 are not limited thereto.

For example, the power consumption information screens 403 and 404 may include a name of each of the home appliances, the total power usage amount information, the power usage amount information supplied from the PV module 111, the power usage amount information supplied from the power system 121, and the generated electric charge information. That is, the control device 300 may generate the total power usage amount information for each of the home appliances, the usage information of the PV power, the power usage amount information supplied from the power system 121, and the generated electric charge information to transmit the generated power consumption information to the terminal 400.

The total power usage information represents the total amount of power used for the corresponding home appliance for a predetermined time. Although the power consumption information screens 403 and 404 are shown as providing the power consumption information for one day in FIGS. 21A and 21B, the period may be freely changed.

According to an embodiment, each of the power consumption information screens 403 and 404 may further include charge information corresponding to the total power usage amount information. In FIG. 21A, it is seen that the power used for one day by the washing machine is about 2.1 kWh, and the electric charge is about $0.54. The corresponding electric charge represents an electric charge when all of about 2.1 kWh is supplied from the power system 121. Similarly, in FIG. 21B, it is seen that the power used for one day by the air conditioner is about 8 kWh, and when all of 8 kWh is supplied from the power system 121, the electric charge is about $2.24.

The power consumption information screens 403 and 404 may include the power usage amount information supplied from the PV module 111 and the usage amount information of the power supplied from the power system 121. Referring again to FIG. 21A, it is seen that about 1.4 kWh of the power used for one day by the washing machine is the power supplied from the PV module 111, and about 0.7 kWh is the power supplied from the power system 121. Referring again to FIG. 21b, it is seen that about 6.4 kWh of the power used for one day by the air conditioner is the power supplied from the PV module 111, and about 1.6 kWh is the power supplied from the power system 121.

The generated electric charge information may correspond to the usage amount of the power supplied from the electric power system 121 among the total power consumption amount of the home appliances. In FIG. 21A, the power supplied from the power system 121 of the washing machine is about 0.7 kWh, and the electric charge for about 0.7 kWh is about $0.18 so that the daily electric charge of the washing machine may be about $0.18. In FIG. 21B, the power supplied from the power system 121 of the air conditioner is about 1.6 kWh, and the electric charge for about 1.6 kWh is about $0.45. Thus, the electric charge for the air conditioner may be about $0.45.

The control device 300 may provide the power consumption information for each appliance to the user so that the user may easily check the power consumption status of the appliances. Also, the control device 300 may more intuitively provide the benefit of using the power generated by the PV module 111 to the user.

Hereinafter, another embodiment associated with the operation of the control device 300 of the HEMS 10 will be described.

FIG. 22 is a flowchart illustrating an operation method of the control device according to an embodiment.

Referring to FIG. 22, the control device 300 may predict the power generation amount of the PV module 111 (S2200).

For example, the control device 300 may predict the power generation amount of the PV module 111 on the basis of the power generation performance of the PV module 111, the weather forecast, the past generation amount information, the sunlight irradiation angle, and the like.

The power generation performance and the past power generation amount information may be previously stored in the storage unit 320. Also, in the case of the information related to the weather forecast or the sunlight irradiation angle, the control device 300 may receive the information from the meteorological service server connected through the network or may acquire related information through the Internet.

The control device 300 may calculate the PV power generation amount to be sold on the basis of the predicted power generation amount and the power consumption amount (S2210).

The power consumption may represent the power consumption amount in the home in which the PV module 111 is installed or the total sum of the power consumption amount of each of the home appliances 151 connected to the HEMS gateway 100. For example, the control device 300 may predict the power consumption amount on the basis of the power usage information for a predetermined period. According to an embodiment, when the user of the terminal 400 inputs the power consumption amount through the terminal 400, data including the inputted power consumption amount may be received from the terminal 400. The information or data with respect to the power consumption amount may be stored in the storage unit 320.

The control device 300 may calculate the power generation amount to be sold to a third person among the power generation amount of the PV module 111 on the basis of the power generation amount and the power consumption amount of the PV module 111 predicted in the operation S2200.

The operations S2200 to S2210 will be described in more detail with reference to FIGS. 23 to 24.

Hereinafter, it is assumed that the control device 300 predicts the time-based power generation amount of the PV module 111 in FIGS. 23 to 28. That is, the control device 300 may predict the time-based power generation amount of the PV module 111. In this case, the power consumption amount may also represent the time-based power consumption amount. However, according to an embodiment, the control device 300 may estimate the daily power generation amount of the PV module 111 by summing up, and the power consumption amount may also represent the total daily consumption amount.

FIG. 23 is a table showing predicted results of the time-based power generation amount when the control device predicts the time-based power generation amount of the PV module according to an embodiment.

FIG. 23 shows the eleventh table, TABLE 11, including the predicted results with respect to the time-based power generation amount of the PV module 111. The control device 300 may generate the predicted results on the basis of the power generation performance of the PV module 111, the weather forecast, the past generation amount information, and/or the sunlight irradiation angle as described above.

According to an embodiment of FIG. 23, the predicted power generation amount from 8:00 hours to 10:00 hours is total 1 kWh, and the predicted power generation amount from 10:00 hours to 12:00 hours is total 3 kWh. The predicted power generation amount from 12:00 hours to 14:00 hours is total 6 kWh, the predicted power generation amount from 14:00 hours to 16:00 hours is total 5 kWh, and the predicted power generation amount from 16:00 hours to 18:00 hours is total 3 kWh. In general, a power generation amount from 12:00 hours to 14:00 hours having a high sunlight irradiation angle may be higher than other time zones, but this may vary depending on weather forecasts and the like.

According to an embodiment, the control device 300 may store the generated power generation prediction result. Also, the control device 300 may transmit the generated power generation prediction result to the terminal 400 to provide the prediction result to the user.

Figures 24, 25A:
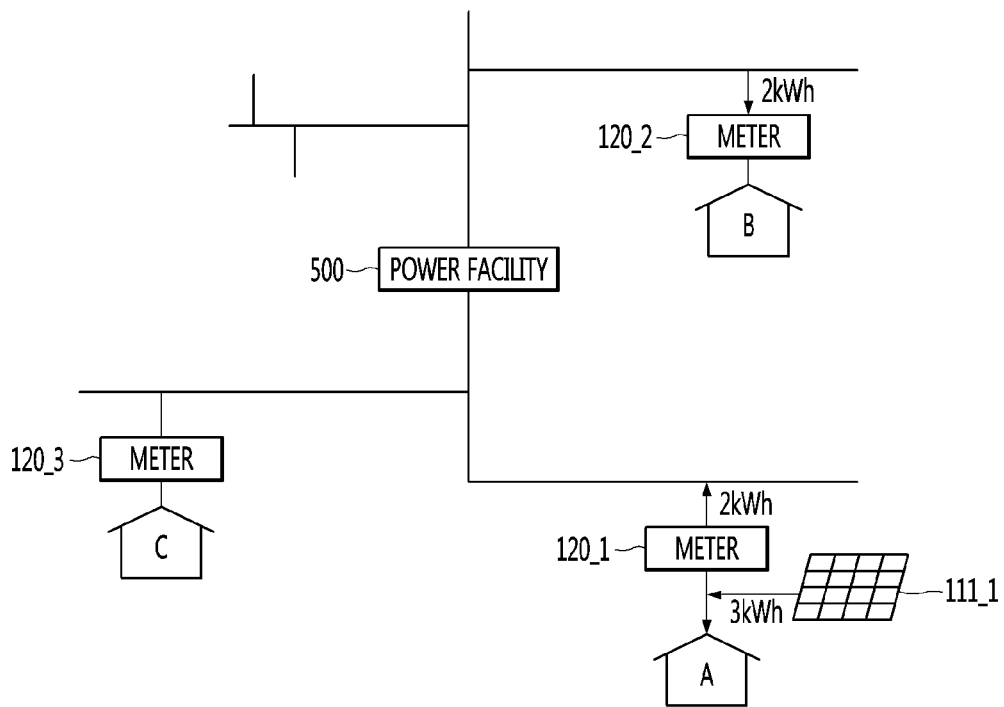
FIG. 24 is a table showing an example of a PV power amount to be sold, which is calculated based on the predicted results of the time-based power generation amount of FIG. 23 and a time-based power consumption amount.
FIGS. 25A and 25B are views illustrating an example of an operation in which sale power is supplied from a seller to a purchaser on the basis of the PV power generation amount to be sold, respectively.

FIG. 24 is a table showing an example of the PV power amount to be sold, which is calculated based on the predicted results of the time-based power generation amount and a time-based power consumption amount of FIG. 23.

Referring to the eleventh table, TABLE 11, of FIG. 23 and the twelfth table, TABLE 12, of FIG. 24, the control device 300 may calculate the PV power generation amount to be sold on the basis of the time-based predicted generation amount of the PV module 111 and the time-based power consumption amount in the home in which the PV module 111 is installed.

The time-based power consumption amount may be predicted by the control device 300 on the basis of the power usage information for a predetermined period as described above in the operation S2210 of FIG. 22 or may be received from the terminal 400.

The control device 300 may calculate the PV power generation amount to be sold on the basis of the difference between the predicted power generation amount and the power consumption amount. Referring to the eleventh table, TABLE 11 in FIG. 23, and the twelfth table, TABLE 12 in FIG. 24, the predicted power generation amount from 8:00 hours to 10:00 hours is total 1 kWh, and the power consumption amount is total 1 kWh. Thus, the control device 300 may not sell the PV power from 8:00 hours to 10:00 hours. On the other hand, the estimated power generation amount from 10:00 hours to 12:00 hours is total 3 kWh, and the power consumption amount is total 1 kWh. Thus, the control device 300 may sell total 2 kWh of the PV power from 10:00 hours to 12:00 hours. That is, since about 2 kWh of the amount of power generated by the PV module 111 from 10:00 hours to 12:00 hours is not consumed in the home, the control device 300 may sell the remaining power that is about 2 kWh.

Referring again to the eleventh table, TABLE 11 in FIG. 23, and the twelfth table, TABLE 12 in FIG. 24, the predicted power generation amount from 12:00 hours to 14:00 hours is total 6 kWh, and the power consumption amount is total 2 kWh. Thus, the control device 300 may sell total 4 kWh of the PV power from 12:00 hours to 14:00 hours. The estimated power generation amount from 14:00 hours to 16:00 hours is total 5 kWh, and the power consumption amount is total 3 kWh. Thus, the control device 300 may sell total 2 kWh of the PV power from 14:00 hours to 16:00 hours. Finally, since the predicted power generation amount from 16:00 hours to 18:00 hours is total 3 kWh, the control device 300 may not sell the PV power from 16:00 hours to 18:00 hours.

That is, the control device 300 may automatically calculate the PV power generation amount to be sold on the basis of the predicted power generation amount of the PV module 111 and the power consumption amount in the home.

The description will be made again with reference to FIG. 22.

The control device 300 may receive power purchase information from the purchasers (S2220). The control device 300 may receive the power purchase information from the control device of each of the purchasers. According to an embodiment, when each of the purchasers registers the power purchase information in a power supply server or the like, the control device 300 may receive the registered power purchase information from the power supply server.

The power purchase information may include an amount of power to be purchased and price information. The power amount and the price may be different according to the power purchase information. According to an embodiment, the power purchase information may further include information on a purchase time zone.

The control device 300 may set the sales price on the basis of the received purchase information (S2230).

Particularly, the control device 300 may select at least one purchaser to sell the PV power on the basis of the amount of power and the price to be purchased included in the received power purchase information of each of the purchasers. The control device 300 may set the sales price for the PV power generation amount to be sold on the basis of the power purchase information of each selected purchaser. The sales price may be set based on the selling unit price and the PV power generation amount to be sold.

The control device 300 may provide the sales power corresponding to the calculated amount on the basis of the set sales price (S2240).

The providing of the sale power corresponding to the calculated amount may represent that the power corresponding to the PV power generation amount is transmitted to the power system 121, and the purchaser supplies the power corresponding to the PV power generation amount to be sold from the power system 121.

The control device 300 may transmit a control signal for providing the amount of PV power to be sold to the purchaser to the HEMS gateway 100. The HEMS gateway 100 may control the PV inverter 110 and the meter 120 to transmit the PV power generation amount to be sold to the power system 121 via the meter 120 in response to the received control signal.

The operations S2230 to S2240 will be described in more detail with reference to FIGS. 25A to 25B.

Figure 25B:
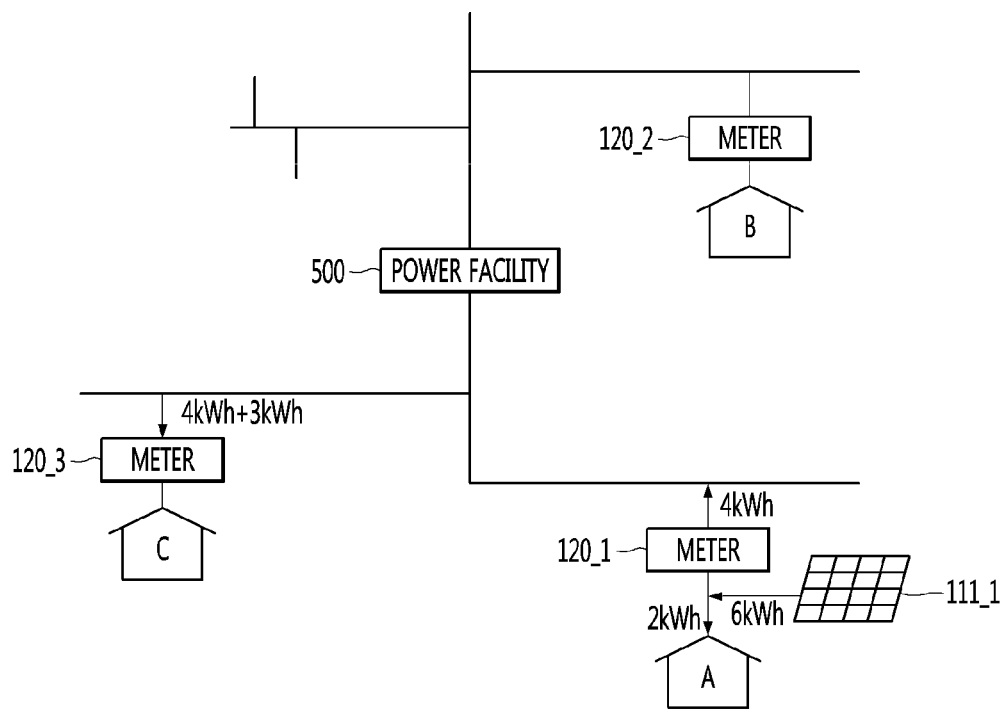

FIGS. 25A to 25B are views illustrating an example of an operation in which the sale power is supplied from a seller to a purchaser on the basis of the PV power generation amount to be sold, respectively.

Referring to FIGS. 25A to 25B, the control device of the HEMS 10 of a user A may calculate the time-based PV power generation amount to be sold according to an embodiment shown in FIGS. 23 and 24.

The control device 300 may receive power purchase information of each of the purchasers. For example, the control device 300 may receive the power purchase information of a purchaser B and the power purchase information of a purchaser C. Here, it is assumed that the power purchase information of the purchaser B includes information that he intends to purchase power of 2 kWh at the total cost of $0.18 in the time zone from 10:00 hours to 12:00 hours. Also, it is assumed that the power purchase information of the purchaser C includes information that he intends to purchase power of about 4 kWh at the total cost of $0.36 in the time zone from 12:00 hours to 14:00 hours.

The control device 300 may determine that the PV power generation amount of about 2 kWh from 10:00 hours to 12:00 hours is sold to the purchaser B for the total of $0.18 on the basis of the received power purchase information. That is, the control device 300 may set the sales price for the PV power generation amount of about 2 kWh from 10:00 hours to 12:00 hours as $0.18. Also, the control device 300 may determine to sell the PV power generation amount of about 4 kWh from 12:00 hours to 14:00 hours to the purchaser C to the total of $0.36. That is, the control device 300 may set the sales price for the PV power generation amount of about 4 kWh from 12:00 hours to 14:00 hours as $0.36.

In this case, the control device 300 may transmit information or data related to the power transaction to a control device of the purchaser B and a control device of the purchaser C, respectively. According to an embodiment, the control device 300 may transmit information or data related to the power transaction with the purchaser B and the purchaser C to a server of the power facility 500.

Referring to FIG. 25A, in the time zone from 10:00 hours to 12:00 hours, about 1 kWh of about 3 kWh of the amount of power generated from a PV module 111_1 installed in the home of the purchaser A may be supplied to the home appliances 151 provided in the home. The remaining amount of power that corresponds to about 2 kWh may be supplied to the power system 121 through a meter 120_1, so that a power amount corresponding to about 2 kWh may be sold.

The home of the purchaser B may receive the power amount of about 2 kWh corresponding to the power amount sold by the user A through a meter 120_2. The power amount of about 2 kWh may not be purchased from the power facility 500, but correspond to the amount of power purchased from the user A.

Referring to FIG. 25B, in the time zone from 12:00 hours to 14:00 hours, about 2 kWh of about 6 kWh of the amount of power generated from the PV module 111_1 installed in the home of the purchaser A may be supplied to the home appliances 151 provided in the home. The remaining amount of power that corresponds to about 4 kWh may be supplied to the power system 121 through a meter 120_1, so that a power amount corresponding to about 4 kWh may be sold.

The home of the purchaser C may receive the power amount of about 4 kWh corresponding to the power amount sold by the user A through a meter 120_3. The power amount of about 4 kWh may not be purchased from the power facility 500, but correspond to the amount of power purchased from the user A. Also, when the power consumption amount in the home of the purchaser C is about 7 kWh, a power amount of about 3 kWh may be additionally supplied through the meter 120_3. The power amount of about 3 kWh may be purchased from a seller other than the user A or purchased from the power facility 500.

Figure 26:
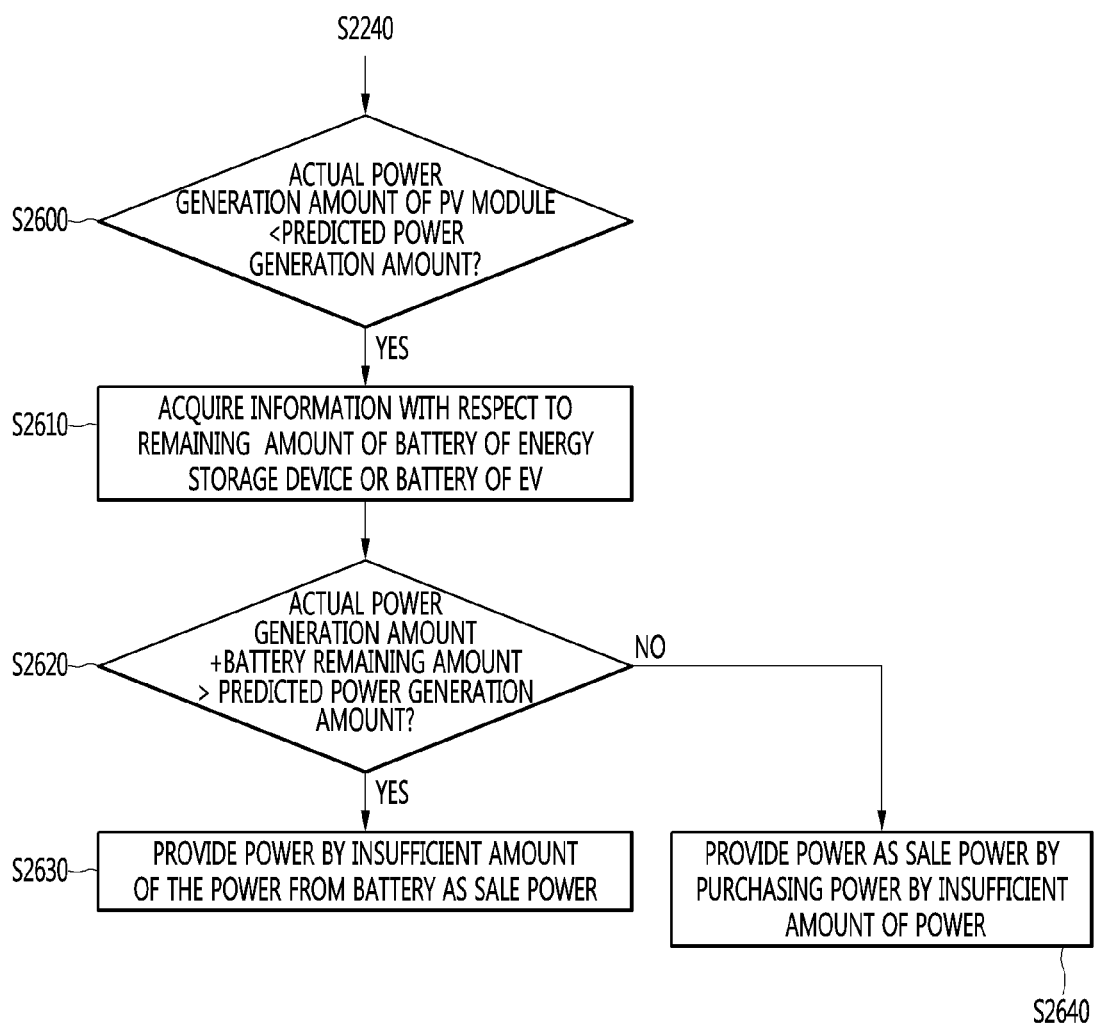
FIG. 26 is a flowchart illustrating an operation of the control device when an actual power generation amount of the PV module is less than the predicted power generation amount according to an embodiment.

FIG. 26 is a flowchart illustrating an operation of the control device when an actual power generation amount of the PV module is less than the predicted power generation amount according to an embodiment.

Referring to FIG. 26, the control device 300 may receive information on the actual power generation amount of the PV module 111 and compare the actual power generation amount to the predicted power generation amount.

The PV module 111 or the PV inverter 110 may transmit the actual power generation amount information of the PV module 111 to the HEMS gateway 100, and the HEMS gateway 100 may control the received actual generation amount information to the control device 300. The control device 300 may receive the actual power generation amount information from the HEMS gateway 100.

In the compared results, when the actual power generation amount is less than the predicted power generation amount (YES in operation S2600), the control device 300 may acquire information on the remaining amount of the battery 133 or the EV 141 of the ESS 130 of the HEMS 10 (S2610).

If the actual power generation amount is less than the predicted power generation amount, the PV power amount to be sold to the purchaser may not be provided to the purchaser. In this case, the control device 300 may provide an insufficient amount of the power by using the amount of power stored in the battery 133 of the ESS 130 or the battery of the EV 141. For this, the control device 300 may acquire the information on the remaining amount of the battery 133 or the EV 141 of the ESS 130 of the HEMS 10.

The HEMS gateway 100 may receive the information on the remaining amount of the battery 133 from the ESS 130 or the information on the remaining amount of the battery of the EV 141 from the EV 141 or the EV charger 140. The HEMS gateway 100 may transmit the information on the received remaining amount of the battery to the control device 300.

The control device 300 may determine whether the sum of the actual power generation amount and the remaining battery power is equal to or more than the predicted power generation amount on the basis of the information on the received remaining power of the battery.

When the sum of the actual power generation amount and the remaining battery power is equal to or more than the predicted power generation amount (YES in operation S2620), the control device 300 may supply the power of the battery 133 of the ESS 130 or the battery of the EV 141 by power of a shortage as sales power (S2630). The case in which the sum of the actual power generation amount and the remaining battery power is equal to or more than the predicted power generation amount may represent a case in which the amount of power to be sold to the purchaser is provided by using the PV power generation amount and the amount of power stored in the battery. That is, when the actual power generation amount of the PV module 111 is less than the predicted power generation amount, the control device 300 may supplement the deficiency by using the power amount of the battery.

The control device 300 may transmit a control signal to the HEMS gateway 100 to provide the amount of power of the battery as much as the insufficient amount. The HEMS gateway 100 may respond to the received control signal to control the ESS 130 or the EV charger 140 and thereby to discharge a sufficient amount of power from the battery 133 of the ESS 130 or the battery of the EV 141.

On the other hand, when the sum of the actual power generation amount and the remaining battery power is less than the predicted power generation amount (NO in operation S2620), the control device 300 may purchase as much power as the insufficient amount from another person or power facility to provide the purchased power as sales power (S2640).

That is, when a shortage occurs even when the amount of power of the battery is provided as sales power or when the amount of power stored in the battery is zero, the control device 300 may purchase the power of the insufficient amount from another person or power facility to provide the purchased power as sales power.

The operations S2630 to S2640 will be described in more detail with reference to FIGS. 27 and 28.

Figure 27:
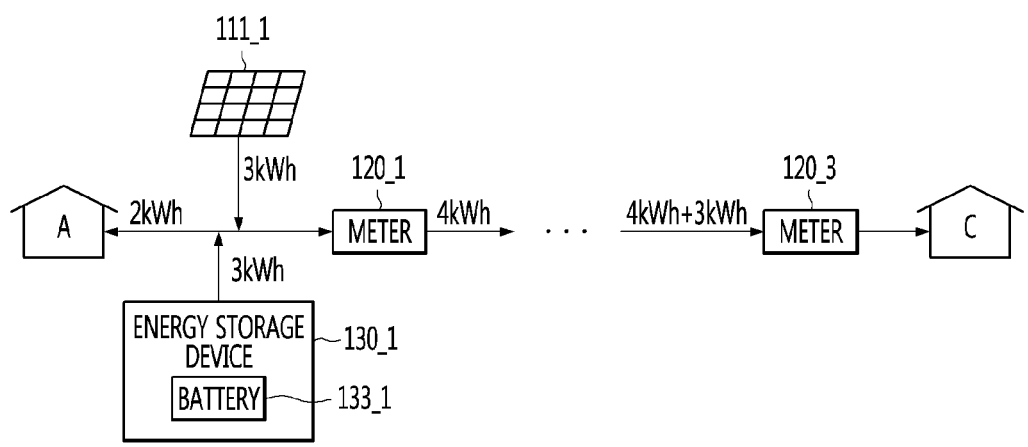
FIGS. 27 and 28 are views illustrating an operation in which the sale power is supplied to the purchaser according to an embodiment of FIG. 26, respectively.
Figure 28:
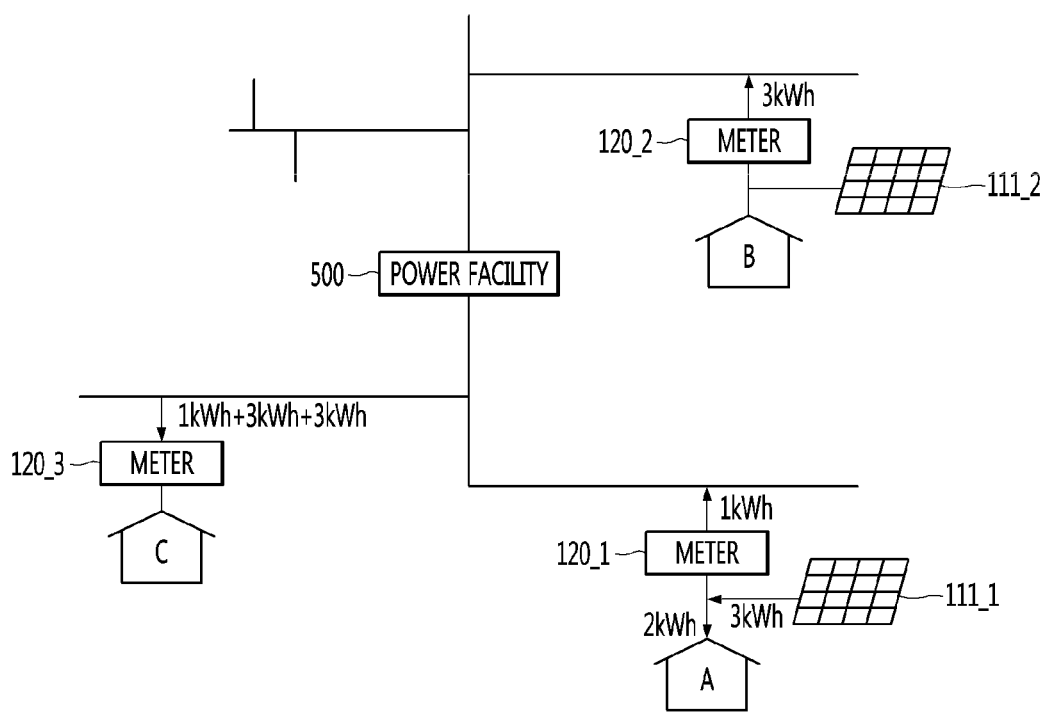

FIGS. 27 and 28 are views illustrating an operation in which the sold power is supplied to the purchaser according to an embodiment of FIG. 26, respectively. Hereinafter, FIGS. 27 and 28 will be described by applying the examples illustrated in FIGS. 23 to 25B.

Referring to FIG. 27, in the time zone from 12:00 hours to 14:00 hours, the predicted power generation amount of the PV power generation module 111_1 installed in the home of the user A may be about 6 kWh, and the power generation amount to be sold by the purchaser C may be about 4 kWh. However, the actual power generation amount of the PV module 111_1 in the corresponding time zone may be merely about 3 kWh. Since the power consumption amount in the home of the user A is about 2 kWh in the corresponding time zone, only about 1 kWh of about 3 kWh of the power generation amount of the PV module 111_1 may be provided to the purchaser C. Therefore, deficiency of about 3 kWh may occur.

In this case, the control device 300 may acquire information on the amount of power of the battery 133_1 of the ESS 130_1 and confirm the amount of power of the battery 133_1 on the basis of the acquired information. When the sum of the power amount of the battery 133_1 and the actual power generation amount is equal to or larger than the predicted power generation amount, i.e., when the power amount of the battery 133_1 is equal to or more than the insufficient amount, the control device 300 may transmit the amount of power from the battery 133_1 to the purchaser C.

That is, the control device 300 may transmit a control signal to the HEMS gateway 100 for controlling the battery 133_1 to discharge a power amount of about 3 kWh by shortage. The HEMS gateway 100 may control the battery 133_1 to discharge about 3 kWh of the amount of power of the battery 133_1 in response to the received control signal. Thus, a power amount of about 4 kWh, which is the sum of about 1 kWh of the power generation amount of the PV module 111_1 and about 3 kWh of the power amount discharged from the battery 133_1, may be supplied to the power system 121 through the meter 120_1. The home of the purchaser C may receive the power amount that corresponds to about 4 kWh through the meter 120_3. Also, when the power consumption amount in the home of the purchaser C is about 7 kWh, a power amount of about 3 kWh may be additionally supplied through the meter 120_3.

On the other hand, referring to FIG. 28, when the sum of the power amount of the battery 133_1 and the actual power generation amount is less than the predicted power generation amount, i.e., when the power amount of the battery 133_1 is less than the insufficient amount, the control device 300 may purchase a sufficient amount of power from the other person or the power facility 500 to supply the purchased power to the purchaser C.

For example, when the amount of power of the battery 133_1 is 0, deficiency of about 3 kWh may occur. Thus, the control device 300 may purchase the amount of power as much as the deficiency of about 3 kWh from the user B. According to the result of the purchase, a power amount corresponding to about 3 kWh of the power generation amount of the PV module 111_2 installed in the home of the user B may be supplied to the power system 121 through the meter 120_2.

Thus, a power amount of about 4 kWh, which is the sum of about 1 kWh of the power generation amount of the PV module 111_1 of the user A and about 3 kWh of the power generation amount of the PV module 111_2 of the user B, may be supplied to the home of the purchaser C through the meter 120_3.

That is, according to the embodiment of FIGS. 26 to 28, when the actual power generation amount of the PC generation module 111 is less than the predicted power generation amount, the control device 300 may supply the power amount corresponding to the insufficient power using the battery or purchase the power amount from the other person or the power facility 500 to provide the power. Therefore, it is possible to minimize the limitations that may occur when the actual power generation amount is insufficient.

Although not shown, the power facility 500 may apply a penalty to the user A when the control device 300 purchases and supplies the amount of power as much as the insufficient amount from the other person or the power facility 500. For example, the penalty may be to charge an additional fee at the next power trading or to prohibit power trading for a certain period of time, but the type of penalty is not limited thereto.

Figure 29A:
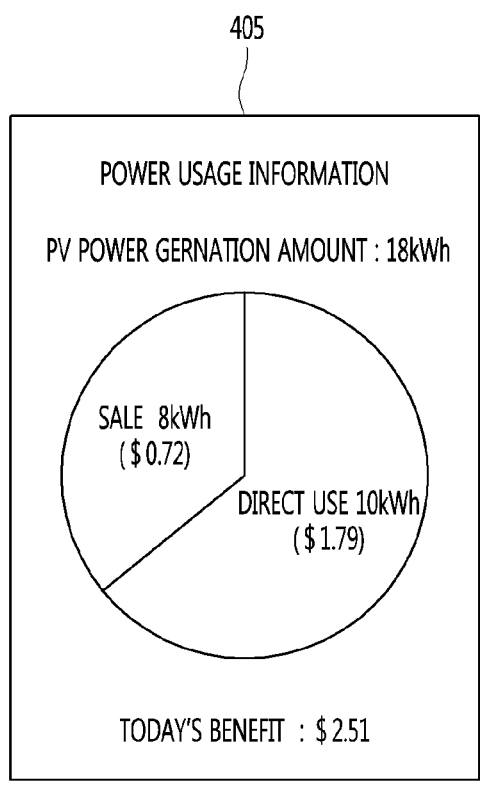
FIG. 29A is a view illustrating an example of the PV power usage information provided to the terminal by the control device for a user.
Figure 29B:
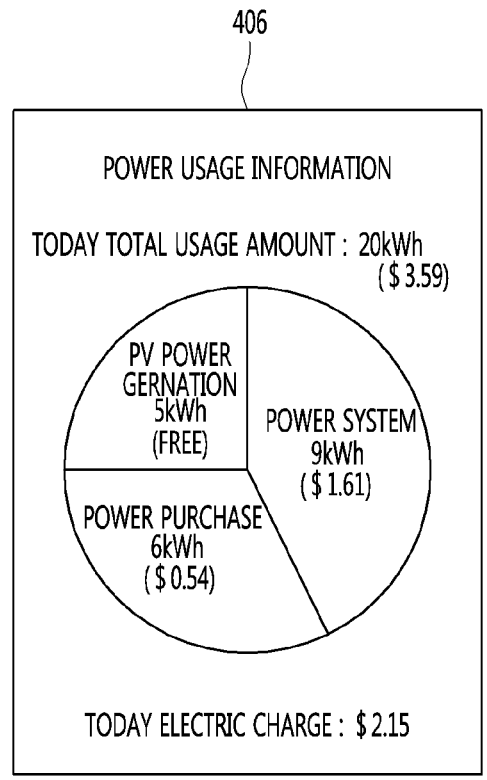
FIG. 29B is a view illustrating an example of power usage information provided to the terminal by the control device for a different user.

FIG. 29A is a view illustrating an example of the PV power usage information provided to the terminal by the control device for a user, and FIG. 29B is a view illustrating an example of the power usage information provided to the terminal by the control device for a different user.

FIG. 29A illustrates an example of a screen 405 including the PV power generation usage information of the user A. As illustrated in FIGS. 22 to 28, the control device of the user A may perform an operation of providing at least a portion of the power generation amount of the PV module 111 as sales power to the purchaser. The control device 300 may acquire the usage information of the power generated from the PV module 111. The acquired PV power usage information may be stored in the storage unit 320 or provided to the terminal 400.

Referring to FIG. 29A, the PV power usage information may include information on the amount of PV power generation amount for a predetermined period of time (e.g., '1 day'), the amount of PV power consumed by the user in the home, the amount of PV power sold to another person, and information on the benefit of use.

For example, it is assumed that about 10 kWh of about 18 kWh of the power generated during one day of the PV module 111 was directly consumed, and about 8 kWh is sold to another person. In this case, information on the profit of direct consumption of about 10 kWh and information on the profit of selling about 8 kW to others may be provided together. Here, the benefit of direct consumption of about 10 kWh may represent a benefit generated when about 10 kWh is supplied from the PV module 111 instead of about 10 kWh purchased from the power facility.

Thus, the profits from the use of about 18 kWh of PV power may be $1.79 for direct consumption of about 10 kWh and $2.51 for about 8 kWh including $0.72 for selling to other people.

That is, the control device 300 may intuitively confirm the profit by providing the profit to the user according to the amount of power generated from the PV module 111.

FIG. 29B illustrates an example of a screen 406 including the power generation usage information of the purchaser C. The control device 300 of the purchaser C may acquire the power consumption information for a predetermined period (for example, "1 day") and store the acquired information in the storage unit 320 or provide the information to the terminal 400.

Referring to FIG. 29B, for example, the power consumption information may include information on the total power consumption, the amount of power supplied from the power system 121 or the power facility 500 of the total usage amount, the amount of power supplied from the PV module 111, and the power amount purchased from other person, and the generated electricity charge.

The total power usage amount represents the total amount of power used for the corresponding home for a predetermined time. In FIG. 29B, it is seen that the total power usage amount for one day in the home of the purchaser C is about kWh, and the electric charge is about $3.59. The corresponding electric charge represents an electric charge when all of about 20 kWh is supplied from the power system 121 or the power facility 500.

The total power consumption may include the amount of power supplied from the power system 121 or the power facility 500, the amount of power supplied from the PV module 111, and the amount of power purchased from others. In case of FIG. 29B, it may be seen that the amount of power supplied from the power system 121 or the power facility 500 is about 9 kWh, the amount of power supplied from the PV module 111 is about 5 kWh, and the amount of power purchased from others is about 6 kWh. Thus, it is seen that the generated electric charge is $1.61 for the power amount of about 9 kWh supplied from the power system 121 or the power facility 500, and $0.54 for the power amount of about 6 kWh purchased from the other person. That is, the purchaser C may intuitively confirm that the power amount of about 5,000 kWh supplied from the PV module 111 reduces the electric charge of $0.90, and the power amount of about 6 kWh purchased from the other person reduces the electric charge of $0.54.

The above-described present invention may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a control unit of the control device. Thus, the detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

According to the embodiment, the control device of the home energy management system may match the power consumption of each of the home appliances with the power generation amount of the PV module and provide the power consumption information for each home appliance, which is generated according to the matching result, to the user. The user may more conveniently confirm the usage state of the power generated by the PV module through the power consumption information for each home appliance.

Also, the control device may set the priority order of each of the home appliances to match the power usage amount of each home appliance with the generation amount of the PV module on the basis of the set priority order. Thus, the user may effectively experience the benefit of using the power generated by the PV module.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control device of a home energy management system (HEMS) having a plurality of home appliances, the control device comprising:

a communication module configured to wiredly or wirelessly connect to a HEMS gateway and a terminal;

a storage configured to store information on a power consumption per hour of each of the home appliances connected to the HEMS gateway; and a controller configured to:

receive usage information comprising a power usage amount of each of the home appliances and power generation information comprising a power generation amount of a photovoltaic (PV) module connected to the HEMS gateway, wherein a total power usage amount of the home appliances corresponds to a sum of the power generation amount of the PV module and an amount of power supplied from a power system, match at least some of the power usage amount of each of the home appliances with the power generation amount of the PV module on the basis of the received usage information and power generation information, match a rest of the power usage amount of each of the home appliances with the amount of power supplied from the power system, generate usage information of PV power for each home appliance on the basis of the matching result, and generate power consumption information for each home appliance based on the generated usage information of PV power for each home appliance, wherein the power consumption information for each home appliance includes charge information on the power usage amount of each home appliance, reduced charge by the PV power for each home appliance, and actual electric charge information corresponding to the amount of power supplied from the power system for each home appliance, wherein the controller is configured to set a matching priority order of each of the home appliances on the basis of the received usage information and to match the power usage amount of each of the home appliances with the power generation amount of the PV module on the basis of the set matching priority order, wherein the matching priority order of each of the home appliances is set in an ascending order of a usage time of each of the home appliances, and wherein the controller is configured to acquire the usage time of each of the home appliances based on the power usage amount of each of the home appliances and the stored information on the power consumption per hour of each of the home appliances.

2. The control device according to claim 1 wherein the matching priority order of each of the home appliances is set in a descending order of the power consumption amount per hour of each of the home appliances.

3. The control device according to claim 1 wherein the usage information comprises a time-based power usage amount of each of the home appliances for time zones within a predetermined period, wherein the power generation information comprises a time-based power generation amount of the PV module for the time zones, and wherein the controller is configured to match the time-based power usage amount of each of the home appliances with the time-based power generation amount of the PV module on the basis of the usage information, the power generation information, and the matching priority order.

4. The control device according to claim 3, wherein the matching priority order is set differently for each time zone on the basis of the time-based power usage amount of each of the home appliances for each time zone.

5. The control device according to claim 1, wherein the controller is configured to transmit to the terminal the power consumption information for each of the home appliances through the communication module.

6. A control device of a home energy management system (HEMS) having a plurality of home appliances, the control device comprising:
   a communication module configured to wiredly or wirelessly connect to a HEMS gateway and a terminal; and
   a controller configured to:
      control power generated from a photovoltaic (PV) module and power supplied from a power system to be supplied to each of the home appliances connected to the HEMS gateway,
      match at least some of a power usage amount of each of the home appliances with a power generation amount of the PV module,
      match a rest of the power usage amount of each of the home appliances with a supplied power amount of the power system,
      generate usage information of PV power for each home appliance on the basis of the matching result, and
      generate power consumption information based on the generated usage information of the PV power for each home appliance,
   wherein the power consumption information for each home appliance includes charge information on the power usage amount of each home appliance, reduced charge by the PV power for each home appliance, and actual electric charge information corresponding to the amount of power supplied from the power system for each home appliance,
   wherein the controller is configured to set a matching priority order of each of the home appliances and to match the power usage amount of each of the home appliances with the power generation amount of the PV module on the basis of the set matching priority order, and
   wherein the matching priority order of each of the home appliances is set in an ascending order of a usage time of each of the home appliances.

7. The control device according to claim 6, wherein the matching priority order is set in a descending order of a power consumption amount per hour of each of the home appliances.

8. The control device according to claim 6, wherein the power usage amount comprises a time-based power usage amount of each of the home appliances,
   wherein the power generation amount comprises a time-based power generation amount of the PV module for time zones within a predetermined period, and
   wherein the controller is configured to generate usage information of the PV power for each time zone with respect to each of the home appliances on the basis of the time-based power usage amount and the time-based power generation amount.

9. The control device according to claim 8, wherein the matching priority order is set differently for each time zone on the basis of the time-based power usage amount of each of the home appliances.

10. The control device according to claim 6, wherein the controller is configured to transmit to the terminal the power consumption information for each of the home appliances through the communication module.

11. A home energy management system (HEMS) gateway comprising:
    a communication module wiredly or wirelessly connected to a plurality of home appliances; and
    a controller configured to:
       control power generated from a photovoltaic (PV) module and power supplied from a power system to be supplied to each of the home appliances,
       match at least some of a power usage amount of each of the home appliances with a power generation amount of the PV module,
       match a rest of the power usage amount of each of the home appliances with a supplied power amount of the power system,
       generate usage information of PV power for each of the home appliances on the basis of the matching result, and
       generate power consumption information for each home appliance based on the generated usage information of the PV power for each home appliance,
    wherein the power consumption information for each home appliance includes charge information on the power usage amount of each home appliance, reduced charge by the PV power for each home appliance, and actual electric charge information corresponding to the amount of power supplied from the power system for each home appliance,
    wherein the controller is configured to set a matching priority order of each of the home appliances and to match the power usage amount of each of the home appliances with the power generation amount of the PV module on the basis of the set matching priority order, and wherein the matching priority order of each of the home appliances is set in an ascending order of a usage time of each of the home appliances.

12. The HEMS gateway according to claim 11, wherein the matching priority order is set based on a power consumption amount per hour of each of the home appliances.

13. The HEMS gateway according to claim 11, wherein the controller is configured to transmit to a terminal connected to the HEMS gateway the generated power consumption information for each of the home appliances.

14. The HEMS gateway according to claim 11, wherein the power usage amount comprises a time-based power usage amount of each of the home appliances, wherein the power generation amount comprises a time-based power generation amount of the PV module for time zones within a predetermined period, and wherein the controller is configured to generate usage information of the PV power for each time zone with respect to each of the home appliances on the basis of the time-based power usage amount and the time-based power generation amount.

* * * * *